(12) United States Patent
Mizutani et al.

(10) Patent No.: US 7,852,563 B2
(45) Date of Patent: Dec. 14, 2010

(54) LENTICULAR LENS MEDIUM

(75) Inventors: Takao Mizutani, Tokyo (JP); Hirokazu Ando, Tokyo (JP); Takehiko Okajima, Tokyo (JP); Kazuhiko Nagaoka, Tokyo (JP); Nobuo Wakasugi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 12/402,536

(22) Filed: Mar. 12, 2009

(65) Prior Publication Data

US 2009/0231716 A1     Sep. 17, 2009

(30) Foreign Application Priority Data

Mar. 14, 2008   (JP)   ............... 2008-065308

(51) Int. Cl.
*G02B 27/10* (2006.01)
(52) U.S. Cl. ...................... 359/620; 359/463
(58) Field of Classification Search ........... 359/620, 359/463
See application file for complete search history.

(56) References Cited

U.S. PATENT DOCUMENTS

| | | | |
|---|---|---|---|
| 3,355,308 | A | 11/1967 | Walkup |
| 4,315,081 | A | 2/1982 | Kobayashi et al. |
| 5,867,322 | A | 2/1999 | Morton |
| 5,968,667 | A | 10/1999 | Assante et al. |
| 5,989,686 | A | 11/1999 | Song et al. |
| 6,284,839 | B1 | 9/2001 | Fahey et al. |
| 6,373,637 | B1 | 4/2002 | Gulick, Jr. et al. |
| 6,460,993 | B2 | 10/2002 | Pilu |
| 6,465,080 | B2 | 10/2002 | Xing et al. |
| 6,486,937 | B2 | 11/2002 | Morton et al. |
| 6,528,567 | B1 | 3/2003 | Arai et al. |
| 6,657,005 | B1 | 12/2003 | Nishihata et al. |
| 6,972,871 | B2 | 12/2005 | Tsuda et al. |
| 2001/0017649 | A1 | 8/2001 | Yaron |
| 2002/0097492 | A1 | 7/2002 | Cobb et al. |
| 2005/0003223 | A1 | 1/2005 | Koga et al. |
| 2006/0051109 | A1 | 3/2006 | Lim et al. |
| 2006/0082880 | A1 | 4/2006 | Lissotschenko |
| 2008/0102256 | A1* | 5/2008 | Liguzinski et al. .......... 428/206 |
| 2009/0231716 | A1 | 9/2009 | Mizutani et al. |

FOREIGN PATENT DOCUMENTS

| | | |
|---|---|---|
| EP | 0583766 A1 | 2/1994 |
| EP | 0897126 A2 | 2/1999 |
| JP | 09-015766 A | 1/1997 |

(Continued)

OTHER PUBLICATIONS

European Search Report for the related European Appln No. 09155145.7 dated Jun. 30, 2009.

(Continued)

*Primary Examiner*—Joseph Martinez
(74) *Attorney, Agent, or Firm*—Panitch Schwarze Belisario & Nadel LLP

(57) ABSTRACT

A lenticular lens medium forms a lenticular lens which comprises a plurality of semicylindrical-shaped or arc-shaped elongated convex parts. The lenticular lens medium has a volume resistivity of $1\times10^7$-$1\times10^{14}$ $\Omega\cdot$cm and a surface resistivity of $1\times10^8$-$1\times10^{15}$ $\Omega/\square$. The lenticular lens medium including the convex parts has a thickness of 0.3-3 mm.

16 Claims, 11 Drawing Sheets

FOREIGN PATENT DOCUMENTS

| WO | 00063016 A1 | 10/2000 |
| WO | 02074539 A1 | 9/2002 |
| WO | 07114527 A1 | 10/2007 |

OTHER PUBLICATIONS

Keithley Model 6105 Resistivity Adapter Instructions Manual; Publication Data: Oct. 1972; Document No. 31415; 8 pages.

HP Indigo press 5500 product description; Hewlett-Packard Development Company, L.P.; 2007; 8 pages.

A print-out from Hewlett-Packard website entitled "HP Launches Lenticular 3-D Application in EMEA for HP Indigo s2000 Users"; Hewlett-Packard Development Company, L.P.; Jan. 24, 2006; 2 pages.

A print-out from Hewlett-Packard website entitled "DIOSS Expends into Lenticular Markets with its HP Indigo press s2000"; Hewlett-Packard Development Company, L.P; Jan. 31, 2007; 2 pages.

R.Barry Johnson et al.; Advances in lenticular lens arrays for visual display: Current Developments in lens Design and Optical Engineering VI, Proceeding of SPIE, vol. 5874, Paper 5874-06, Sna Diego (Aug. 2005).

Office Action in the related U.S. Appl. No. 12/402,026 dated Mar. 25, 2010.

* cited by examiner

FIG. 11A
FIG. 11B
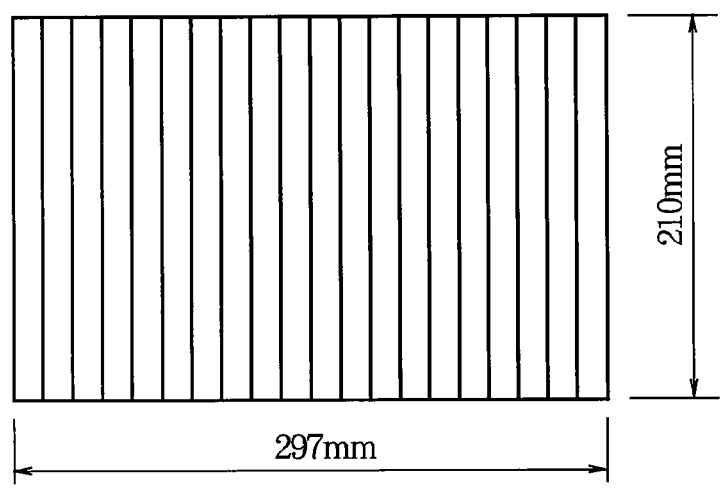
FIG. 12
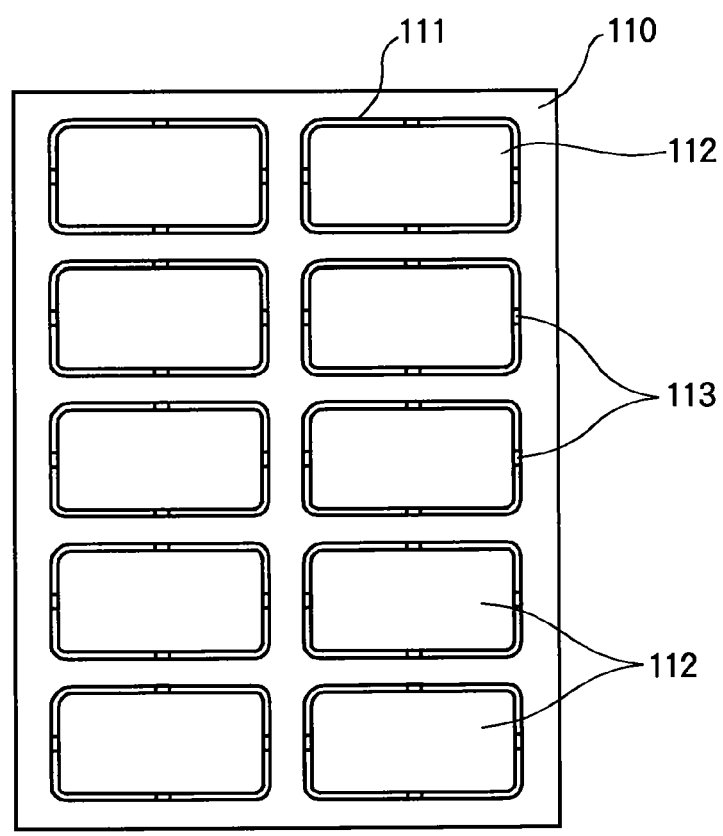

FIG.13

| Example No. | Hydrophilic Polymer Graft Polymer (Weight Parts) | Thermoplastic Resin Methacrylic Resin (Weight Parts) | Anionic Surfactant Dodecyl-benzene-sulfonic acid potassium salt (Weight Parts) | Measurement Results of Plate-like Sheet | | | Printing Results | | |
|---|---|---|---|---|---|---|---|---|---|
| | | | | Volume Resistivity ($\Omega \cdot cm$) | Surface Resistivity ($\Omega/\square$) | Optical Transparency (%) | Printing Density (OD value) | Fixing Rate (%) | Glossiness (%) |
| Example 1 | 40 | 60 | 1.0 | 3.8E+11 | 5.2E+11 | 93 | 1.5 | 100 | 60 |
| Example 2 | 25 | 75 | 1.0 | 8.4E+13 | 1.1E+14 | 94 | 1.4 | 100 | 59 |
| Example 3 | 60 | 40 | 0.1 | 1.4E+10 | 9.8E+10 | 93 | 1.5 | 100 | 60 |
| Example 4 | 25 | 75 | 5.0 | 2.1E+11 | 2.6E+11 | 93 | 1.5 | 100 | 59 |
| Example 5 | 55 | 45 | 5.0 | 1.1E+08 | 1.2E+08 | 91 | 1.4 | 100 | 60 |
| Example 6 | 3 | 97 | 5.0 | 1.0E+14 | 1.1E+15 | 94 | 1.4 | 100 | 60 |
| Example 7 | 100 | 0 | 0.1 | 1.0E+07 | 1.0E+08 | 91 | 1.4 | 100 | 60 |
| Comparison Example 1 | 0 | 100 | 0.0 | 1.0E+16 | 1.0E+16 or more | 95 | 0.8 | 100 | 55 |
| Comparison Example 2 | 25 | 75 | 0.1 | 5.3E+15 | 1.0E+16 or more | 95 | 0.8 | 100 | 55 |
| Comparison Example 3 | 70 | 30 | 5.0 | 1.2E+07 | 1.5E+07 | 91 | 1.2 | 100 | 55 |
| Comparison Example 4 | 55 | 45 | 5.0 | 8.80E+07 | 9.08E+07 | 92 | 1.3 | 100 | 55 |

FIG. 14

| Example No. | Medium Thickness (mm) | Printing Speed (PPM) | Medium Feeding Speed (mm/sec) | Fixing Rate (%) | Deformation/Warping of Medium |
|---|---|---|---|---|---|
| Comparison Example 5 | 0.1 | 18 | 81 | 100 | X |
| Example 8 | 0.2 | 18 | 81 | 100 | O |
| Example 9 | 0.5 | 18 | 81 | 100 | O |
| Comparison Example 6 | 0.2 | 10 | 45 | 100 | X |
| Example 10 | 0.3 | 10 | 45 | 100 | O |
| Example 11 | 0.5 | 10 | 45 | 100 | O |
| Comparison Example 7 | 0.3 | 5 | 30 | 100 | X |
| Example 12 | 0.5 | 5 | 30 | 100 | O |

FIG.15

| Example No. | Volume Resistivity (Ω·cm) | Surface Resistivity (Ω/□) | Optical Transparency (%) | Printing Density (OD Value) | Fixing Rate (%) | Glossiness (%) |
|---|---|---|---|---|---|---|
| Example 13 | 3.7E+11 | 5.0E+11 | 94 | 1.5 | 100 | 62 |
| Comparison Example 8 | 3.8E+11 | 5.2E+11 | 93 | 1.5 | 100 | 60 |

FIG.16

| Example No. | Volume Resistivity (Ω·cm) | Surface Resistivity (Ω/□) | Optical Transparency (%) | Printing Density (OD Value) | Fixing Rate (%) | Glossiness (%) |
|---|---|---|---|---|---|---|
| Example 14 | 4.10E+11 | 1.30E+12 | 93 | 1.5 | 100 | 63 |
| Comparison Example 9 | 3.8E+11 | 5.2E+11 | 93 | 1.5 | 100 | 60 |

FIG.17

| Example No. | Volume Resistivity (Ω·cm) | Surface Resistivity (Ω/□) | Optical Transparency Before Test (%) | Printing Density (OD Value) | Fixing Rate (%) | Glossiness (%) | Optical Transparency After Test (%) |
|---|---|---|---|---|---|---|---|
| Example 19 | 3.9E+11 | 5.4E+11 | 93 | 1.5 | 100 | 60 | 93 |
| Example 20 | 4.0E+11 | 5.5E+11 | 93 | 1.5 | 100 | 60 | 92 |
| Comparison Example 10 | 3.8E+11 | 5.2E+11 | 93 | 1.5 | 100 | 60 | 90 |

LENTICULAR LENS MEDIUM

BACKGROUND OF THE INVENTION

The present invention relates to a lenticular lens medium including a plurality of semicylindrical-shaped or arc-shaped elongated convex parts, and particularly relates to a lenticular lens medium having a surface on which a toner image can be formed using an electrophotographic printing apparatus.

Various printing systems have been proposed for printing apparatuses which perform printing on printing media of, for example, papers, label sheets, envelopes or OHP sheets. For example, there have been proposed wire dot systems, thermal printing systems, thermal transferring systems, ink jet systems, electrophotographic systems or the like. These systems have been put to practical use. Among these systems, printing apparatuses using the electrophotographic systems (i.e., electrophotographic printing apparatuses) can print images with high density and high quality at high-speed. Therefore, the electrophotographic printing apparatuses have been broadly used and commercialized as output terminals of information processing systems of, for example, copiers, facsimile machines, complex machines having functions of copiers and facsimile machines and scanners.

In addition, there is an increasing interest toward image processing of 3-dimensional image such as 3-dimensional computer graphics or virtual reality along with recent popularization of personal computers and improvement in their performance. Therefore, it is strongly desired for 3-dimensional image forming system using computer to visualize and print 3-dimensional image synthesized in the computer.

A conventional lenticular lens includes a plurality of substantially semicylindrical-shaped lenses (hereinafter referred to as linear convex lenses) having specific lens radii arranged with certain pitches, and includes a flat surface on the backside of the linear convex lenses. The lenticular lens is composed of a transparent resin material and has a certain thickness. The lenticular lens can be used as a printing medium. A group of strip-shaped images corresponding to the linear convex lenses are converted into left-right reversed image and printed on the flat surface of the lenticular lens so that an erect image is viewed from the linear convex lenses side. By changing an angle at which the lenticular lens is viewed (from the linear convex lenses side), or by changing an inclination of the lenticular lens, various kinds of stereoscopic image or moving image can be viewed. In this regard, there is known a lenticular lens medium having a back surface on which a printing is performed using ink jet printing system (see Japanese Laid-Open Patent Publication H09-15766).

However, the conventional lenticular lens medium is generally composed of synthetic resin (such as plastic) or the like which is an insulating body having no electrical conductivity. Therefore, when the electrophotographic printing apparatus is used to perform printing on the lenticular lens medium, toner is not transferred from a photosensitive body to the lenticular lens medium in a transferring process, and therefore a sufficient printing density can not be obtained. Furthermore, in a fixing process in which the toner image (having been transferred to the lenticular lens medium in the transferring process) is thermally fixed to the lenticular lens medium, the lenticular lens medium may be rippled, deformed or warped due to heat. As a result, the printing medium providing excellent printing quality can not be obtained.

SUMMARY OF THE INVENTION

The present invention is intended to provide a lenticular lens medium having an excellent toner transferring property when an electrophotographic printing apparatus is used to perform printing on the lenticular lens medium, and having excellent heat resistance.

The present invention provides a lenticular lens medium forming a lenticular lens which includes a plurality of semicylindrical-shaped or arc-shaped elongated convex parts. The lenticular lens medium has a volume resistivity of $1 \times 10^7$-$1 \times 10^{14} \Omega \cdot cm$ and a surface resistivity of $1 \times 10^8$-$1 \times 10^{15} \Omega/\square$. The lenticular lens medium including the convex parts has a thickness of 0.3-3 mm.

With such an arrangement, when printing is performed using an electrophotographic printing apparatus, a high efficiency in transferring toner from an image bearing body can be obtained and a high heat resistivity can be obtained, as will be clear from later described embodiment. Therefore, using the lenticular lens medium according to the present invention, it becomes possible to directly form toner image (according to stereoscopic image processed using a personal computer) on the lenticular lens medium, and to thermally fix the toner image to the lenticular lens medium. Therefore, a printing material with 3-dimensional image of high resolution and high quality can be easily obtained at low cost and at high speed, without providing an ink absorption layer or the like.

The present invention also provides a microarray lens medium forming a microarray lens which includes a plurality of semispherical-shaped dots. The microarray lens medium has a volume resistivity of $1 \times 10^7$-$1 \times 10^{14} \Omega \cdot cm$ and a surface resistivity of $1 \times 10^8$-$1 \times 10^{15} \Omega/\square$.

The present invention also provides a lenticular lens medium including a plurality of semicylindrical-shaped or arc-shaped elongated convex parts formed on a surface of the lenticular lens medium, a flat surface opposite to the surface on which the convex parts are formed, and a toner receiving layer provided on the flat surface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIGS. 11A and 11B are a front view and a plan view showing another example of the lenticular lens medium according to the embodiment of the present invention;

FIG. 12 is a plan view showing still another example of the lenticular lens medium according to the embodiment of the present invention;

FIG. 13 is a table showing measurement results of Examples and Comparative Examples;

FIG. 14 is a table showing measurement results of Examples and Comparative Examples;

FIG. 15 is a table showing measurement results of Examples and Comparative Examples;

FIG. 16 is a table showing measurement results of Examples and Comparative Examples;

FIG. 17 is a table showing measurement results of Examples and Comparative Examples.

DETAILED DESCRIPTION OF THE PREFERRED EMBODIMENT

Preferred embodiments of the present invention will be described with reference to the accompanying drawings.

The lenticular lens medium of the present invention relates to a printing medium used in image processing systems such as copiers, facsimile machines, printers and personal computers, and used as a printing material capable of providing stereoscopic vision or motion picture of information such as characters or images. The stereoscopic vision or motion picture is obtained using various methods, for example, changing (where two or more pictures change depending on viewing angle), morphing (where one of two or more pictures is once blurred and transforms into next picture), zooming (where a picture is viewed as though the picture moves from a near position to a remote position or conversely), and animation (where a picture is viewed as a slightly different picture, or is viewed as though the picture moves). The present invention can be used in wide industrial fields such as on-demand printing, printing PDP, and information processing.

The lenticular lens medium of the present invention is characterized by its constituent materials, which will be described later in detail. First, an explanation is given of the structure and fundamental operation of the lenticular lens medium according to the embodiment of the present invention.

Figure 1:
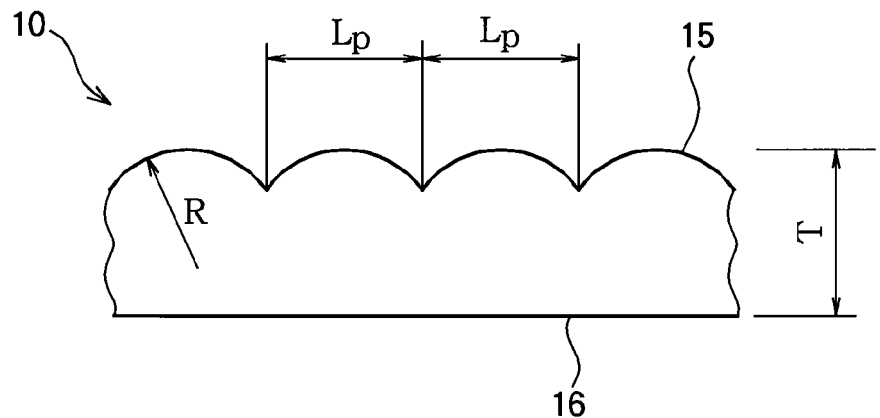
FIG. 1 is a cross-sectional view of a lenticular lens medium according to the embodiment of the present invention.

First, as shown in FIG. 1, the lenticular lens medium 10 of the embodiment includes a plurality of semicylindrical-shaped or arc-shaped elongated convex parts. To be more specific, the lenticular lens medium has a concavo-convex surface 15 where linear convex lenses having semicylindrical-shaped or arc-shaped cross section are arranged in parallel to each other, and a flat printing surface 16 on the backside of the concavo-convex surface 15. The lenticular lens medium 10 is formed of a resin material having a volume resistivity of $1\times10^7$-$1\times10^{14}$ Ω·cm and a surface resistivity of $1\times10^8$-$1\times10^{15}$ Ω/☐ between the concavo-convex surface 15 and the printing surface 16. As shown in FIG. 1, the pitch of the linear convex lenses of the concavo-convex surface 15 is expressed as Lp, the thickness of the lenticular lens medium 10 is expressed as T, and the radius of the linear convex lens is expressed as R. The lens pitch Lp, the lens radius R and the medium thickness T are respectively determined according to application or function.

Figure 2A:
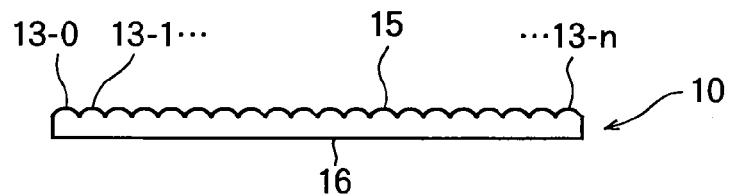
FIGS. 2A and 2B are a front view and a plane view of the lenticular lens medium according to the embodiment of the present invention.
Figure 2B:
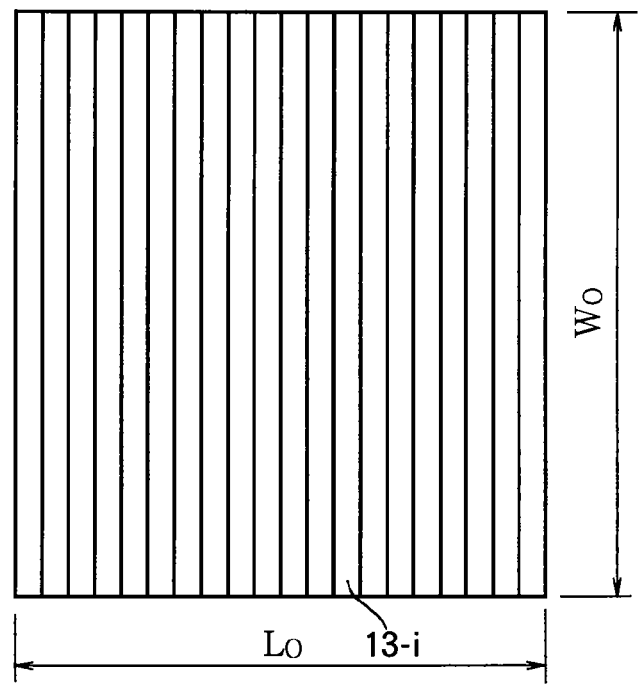
Figure 3:
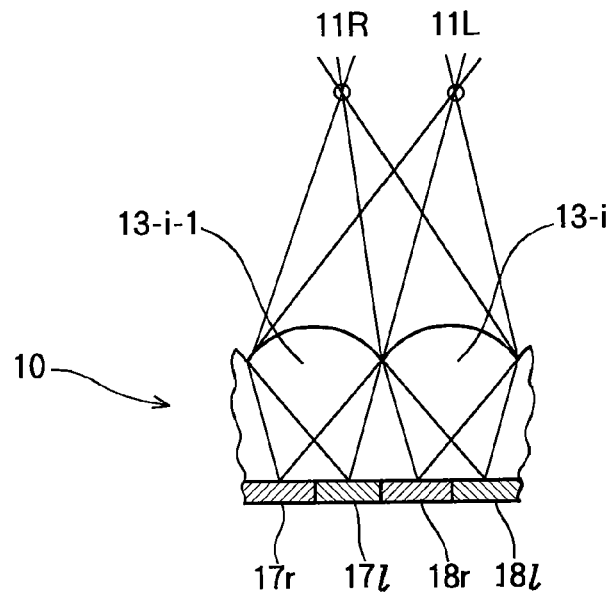
FIG. 3 is a schematic view for illustrating light paths through the lenticular lens medium when an image is viewed stereoscopically according to the embodiment of the present invention.

Next, a brief explanation will be given of a principle upon which an image pattern printed on the lenticular lens medium is stereoscopically viewed, with reference to FIGS. 2 and 3. The lenticular lens medium 10 is composed of a substantially plate-like member having the concavo-convex surface 15 with a plurality of linear convex lenses 13-0 through 13-$n$ and the printing surface 16 opposite to the concave-convex surface 15. An image including printing layers 17$r$, 17$l$, 18$r$ and 18$l$ is printed on the printing surface 16. In other words, different images are printed on the printing surface 16 of the lenticular lens medium 10 opposite to the linear convex lenses 13-0 through 13-$n$. Therefore, when the printed image is viewed via the linear convex lenses 13-0 through 13-$n$ (i.e., from above in FIG. 3), the left eye 11L (FIG. 3) views the image of the printing layer 17$l$ by means of the lens 13-$i$-1 and the image of the printing layer 18$l$ by means of the lens 13-$i$. Similarly, the right eye 11R views the image of the printing layer 17$r$ by means of the lens 13-$i$-1 and the image of 18$r$ by means of the lens 13-$i$. Since the left eye 11L and the right eye 11R view respective different images, a stereoscopic image is viewed due to optical illusion.

In the above described explanation, divided two images are respectively viewed by the left and right eyes via the lenticular lens medium. However, the image can be more finely divided, so as to obtain a printing material capable of providing stereoscopic vision or motion picture of information such as characters or images. The stereoscopic vision or motion picture is obtained using various methods, for example, changing (where two or more pictures change depending on viewing angle), morphing (where one of two or more pictures is once blurred and transforms into next picture), zooming (where a picture is viewed as though the picture moves from a near position to a remote position or conversely), and animation (where a picture is viewed as a slightly different picture, or is viewed as though the picture moves).

Next, an explanation will be given of a configuration for printing a toner image on the lenticular lens medium according to this embodiment using an electrophotographic printing apparatus. Although there are various ways to obtain a toner image using an electrophotographic printing apparatus, an explanation will be given of an example of a tandem-type printing apparatus capable of printing color image.

Figure 4:
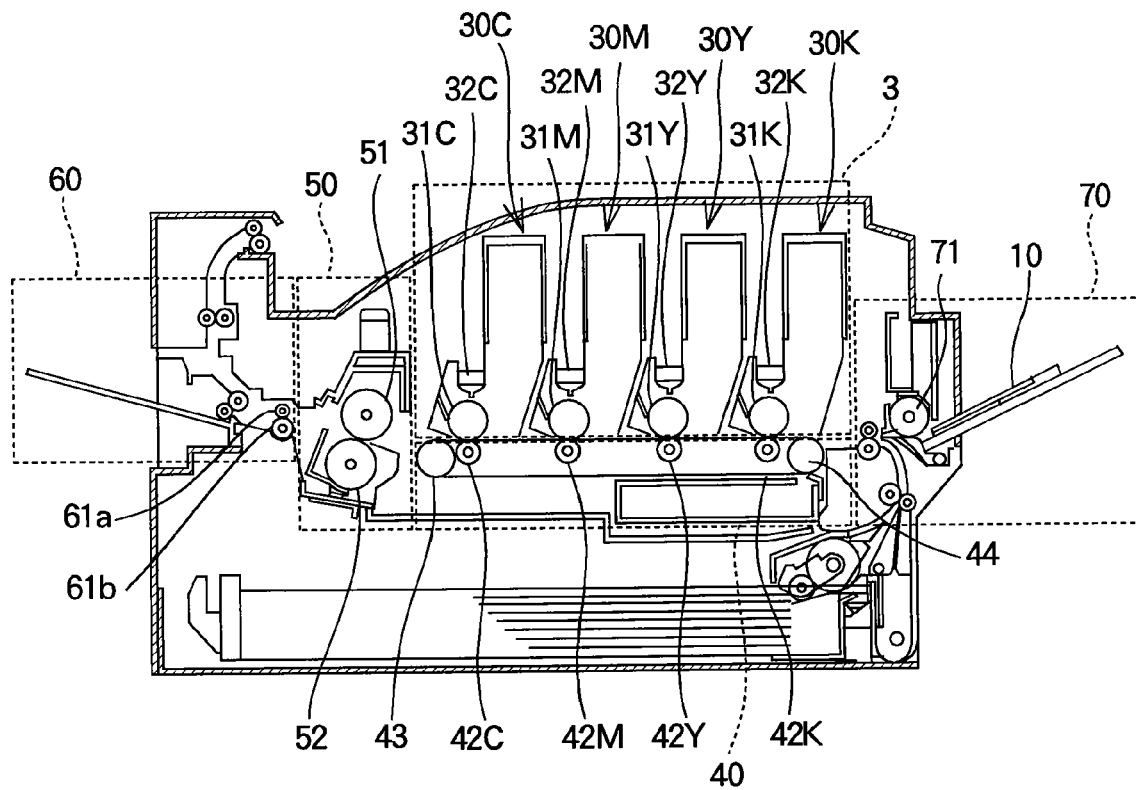
FIG. 4 is a schematic view showing an electrophotographic printing apparatus which performs printing on the lenticular lens medium according to the embodiment of the present invention.

FIG. 4 is a schematic view showing an example of an electrophotographic printing apparatus (hereinafter referred to as a printing apparatus). The printing apparatus includes a medium supplying part 70 for supplying a medium, an image forming part 3 having a configuration for forming toner images, a transfer belt unit 40 including an image transferring part and a medium conveying part, a fixing part (a fixing device) 50 for fixing the toner image, and a medium ejection/stacking part 60 for ejecting the medium. The printing operation is controlled by an image pattern generating part (not shown) and a printing operation controlling part (not shown) which control the sequence, timing and the like of the printing operation.

The medium supplying part 70 is a mechanism capable of supplying a medium such as papers or plastic sheets, and particularly in this embodiment, the lenticular lens medium composed of resin. From the medium supplying part 70, a plurality of sheets of a specific form can be supplied automatically, or sheet(s) can be individually supplied manually. The printing operation is performed by controlling starting, ending or the like of operations of respective components by means of the image pattern generating part (not shown), a printing operation controlling part or the like.

Using this printing apparatus, when the printing operation starts, a supplying roller 71 of the medium supplying part 70 rotates, and conveys the medium (for example, the lenticular lens medium) towards the image forming part 3 and the transfer belt unit 40. An image formation is performed by the image forming part 3 and the transfer belt unit 40. The image forming part 3 includes developing devices 30K, 30Y, 30M and 30C, photosensitive drums 31K, 31Y, 31M and 31C, exposure devices 32K, 32Y, 32M and 32C, and the like. The image forming part 3 and the transfer belt 40 transfer a toner image to the lenticular lens medium 10 conveyed by the transfer belt unit 40. The toner image is transferred onto the flat printing surface 16 (opposite to the concavo-convex surface 15 where the linear convex lenses are arranged) of the lenticular lens medium 10 via a series of processes of charging, exposing, developing and transferring. The toner image formed on the flat printing surface 16 is opposite to an erect image which is viewed via the linear convex lenses in an arranging direction of the linear convex lenses. The toner layer formed on the printing surface 16 of the lenticular lens medium 10 includes printing layers such as the printing layers 17r, 17l, 18r and 18l which are divided in the form of strips as was described with reference to FIGS. 2 and 3.

Further, a detailed explanation will be given of the image forming part 3 for forming the toner image on the lenticular lens medium 10 with reference to FIG. 5. The developing devices 30K, 30Y, 30M and 30C (FIG. 4) of the image forming part 3 have the same configuration, and therefore reference marks for respective colors (K, Y, M, and C) are not used in FIGS. 5 through 7. As described above, the lenticular lens medium 10 is a medium having a lenticular lens part (i.e., the concavo-convex surface 15) on a principal surface and having a flat surface (i.e., the printing surface 16) opposite to the lenticular lens part on which the toner image is printed.

Figure 5:
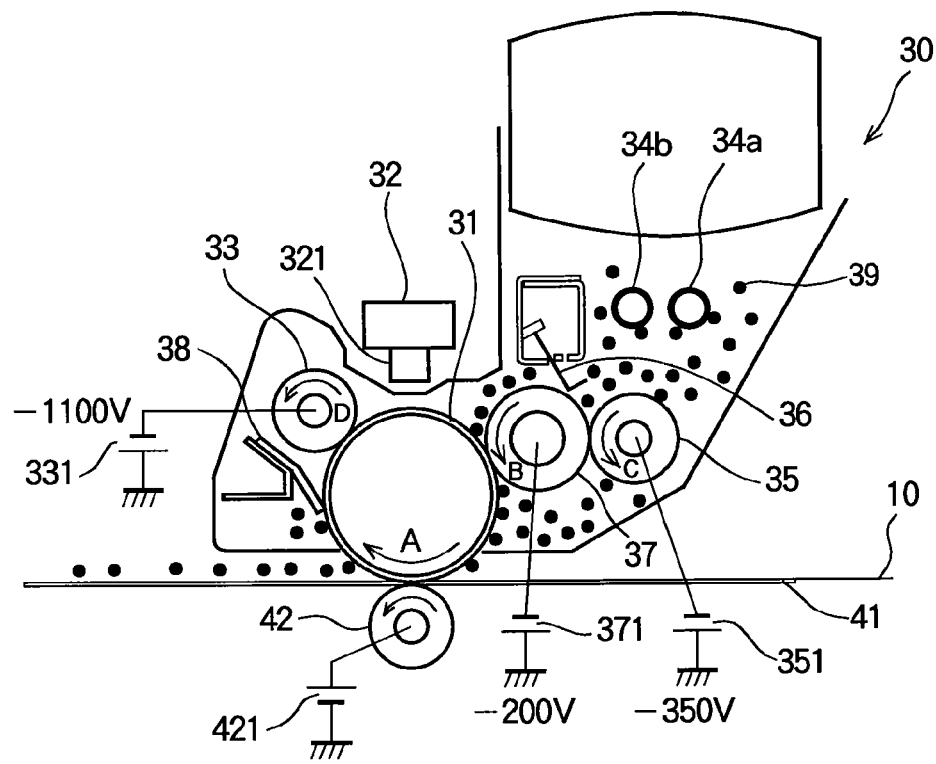
FIG. 5 is a schematic view showing a main part of the electrophotographic printing apparatus which performs a developing process and a transferring process of a toner image in a printing operation on the lenticular lens medium according to the embodiment of the present invention.

As shown in FIG. 5, a charging roller 33 is a substantially cylindrical-shaped rubber roller including a metal shaft and a semiconductive rubber provided around the metal shaft. Both ends of the metal shaft are mounted to bearings at side walls of the developing device 30. The charging roller 33 is pressed against the photosensitive drum 31 and rotates in the direction shown by arrow D. The shaft of the charging roller 33 is supplied with voltage of approximately −1150 V by a high voltage power supply device 331, so as to charge that the surface of the photosensitive rum 31 to approximately −600 V.

The exposure device 32 used in the exposure process includes LED elements (not shown) and Selfoc lenses 321. The Selfoc lenses focus lights from the LED elements onto the surface of the photosensitive drum 31. The LED elements are arranged in a column or a plurality of columns in a lateral direction, and the number of the LED elements is set according to a resolution of the printing apparatus when a medium with a printable maximum width is used. For example, using a printing apparatus capable of A3 size sheet, approximately 15,000 LED elements are arranged. The exposure device performs ON/OFF control of the respective LED elements according to an image pattern to be printed. When the LED elements emit lights, the lights passing through the corresponding Selfoc lenses 321 irradiate onto the surface of the photosensitive drum 31 to form spots with predetermined spot diameters (approximately 20 μm when the printing apparatus has the resolution of 1200 DPI) which correspond to the resolution on the printing apparatus. Electric charge is induced in a charge generation layer at the irradiated spot of the photosensitive drum 31 due to radiant energy, and the charge moves to the surface of the photosensitive drum 31 to cancel the charge having been generated in the charging process, so that a potential of the irradiated spot becomes approximately zero. As a result, an invisible image (referred to as a latent image) of an approximately zero potential is formed on the surface of the photosensitive drum 31 corresponding to the image pattern irradiated by the LED elements which are arranged substantially linearly throughout a width of a printable area.

Next, in the developing device 30, toner particles 39 with mean particle diameter of approximately 5 μm are supplied by a toner cartridge (not shown). Agitating shafts 34a and 34b are disposed in the developing device 30. Both ends of the respective agitating shafts 34a and 34b are mounted to bearings at both side walls (not shown) of the developing device 30, and gears are fixed to one ends of the agitating shafts 34a and 34b. The gears engage a gear fixed to the shaft of a developing roller 37, and are rotated. The toner particles 39 supplied in the developing device 30 is conveyed in the lateral direction in FIG. 5 by the rotation of the agitating shafts 34a and 34b, so that the distribution of the toner particles 39 in the developing device 30 becomes uniform, and the toner particles 39 adhere to a toner supplying roller 35. The toner supplying roller 35 is composed of a substantially cylindrical sponge rubber roller including a metal shaft and a semiconducting foam sponge rubber provided around the metal shaft. Both ends of the metal shaft of the toner supplying roller 35 are mounted to bearing at the side walls of the developing device 30 (as is the case with the charging roller 33), and the toner supplying roller 35 is pressed against the developing roller 37. The developing roller 37 is a substantially cylindrical roller including a metal shaft and a semiconductive rubber around the metal shaft. A surface layer is provided on the developing roller 37, which contains a substance having a property to negatively charge the toner particles 39 when the substrate contacts the toner particles 39. Both ends of the metal shaft of the developing roller 37 are mounted to bearings at the side walls of the developing device 30 (as is the case with the toner supplying roller 35). The developing roller 37 is pressed against the surface of the photosensitive drum 31 and the toner supplying roller 35. Gears are fixed to one sides of the metal shafts of the photosensitive drum 31, the developing roller 37 and toner supplying roller 35, and engage each other so that the photosensitive drum 31, the developing roller 37 and the toner supplying roller 35 rotate together with each other respectively in directions as shown in arrows A, B and C in FIG. 5.

The shaft of toner supplying roller 35 is supplied with a voltage of approximately −350 V by a high voltage power supply device 351. The shaft of developing roller 37 is supplied with a voltage of approximately −200 V by a high voltage power supply device 371. The toner supplying roller 35 and the developing roller 37 rotate in the same direction as shown by arrow B and C in a state where the toner supplying roller 35 and the developing roller 37 are pressed against each other. Thus, at an upstream side of a contact portion between the toner supplying roller 35 and the developing roller 37, undeveloped toner adheres to the surface of the developing roller 37. The undeveloped toner is scraped from the developing roller 37 and friction between the toner particles is generated, so that the toner particles are negatively charged. The material of the toner supplying roller 35 is selected among materials that cause the toner particles to be negatively charged due to friction. Due to electric potential difference between the toner supply roller 35 and the developing roller 37 at the contact portion, the toner particles adhere to the surface of developing roller 37 and are conveyed to the downstream side.

A developing blade 36 is composed of a thin metal blade (having a thickness of 0.1 mm), and is bent at a position of 1.5 mm from a tip of the developing blade 36 to form a curvature portion R. The curvature portion R is pressed against the developing roller 37. At the contact portion between the developing blade 36 and the developing roller 37, a toner thin layer is formed of the toner particles 39 on the surface of the developing roller 37 by means of the developing blade 36. Further, the toner particles 39 contact the toner supplying roller 35 and the developing roller 37 to cause friction, and are electrically charged. In this manner, the toner particles 39 on the developing roller 37 having passed the developing blade 36 form the toner layer having a thickness and electric charge both of which are determined according to a dimension of the curvature portion R of the developing blade 36, a pressure with which the developing blade 36 is pressed against the developing roller 37, a location of the curvature portion R, an installation angle of the developing blade 36, and other factors. For example, the toner particles 39 having passed the developing blade 36 form the toner layer having a uniform thickness of approximately 25 µm and having a toner volume of approximately 0.6 mg/cm$^2$, and is suitably charged to approximately 25 µC/g.

The developing roller 37 and the photosensitive drum 31 are pressed against each other, and respectively rotate in directions shown by arrows A and B opposite to each other. At a contact portion between the developing roller 37 and the photosensitive drum 31, where the latent image is formed on the photosensitive drum 31, a coulomb force is generated by an electric field (caused by the electric potential difference between the developing roller 37 and the photosensitive drum 31) and the electric charge of the toner particles 39 in a direction from the developing roller 37 toward the photosensitive drum 31, so that the toner particles 39 move to the circumferential surface of the drum 31. Since the toner particles 39 move from the developing roller 37 to the latent image on the photosensitive drum 31 corresponding to the image pattern, a visualized image (i.e., the toner image) is obtained. This process is referred to as development. At a portion except the latent image on the surface of the photosensitive drum 31, an electric field is generated in the opposite direction, i.e., a coulomb force is generated in a direction from the photosensitive drum 31 toward the developing roller 37, and the toner particles 39 do not move from the developing roller 37. The toner particles 39 that do not move from the developing roller 37 are referred to as undeveloped toner. According to the rotation of the developing roller 37, the undeveloped toner, adhering to the developing roller 37, is conveyed to the contact portion between the developing roller 37 and the toner supplying roller 35, and is scraped from the developing roller 37. Meanwhile, the toner particles 39 (i.e., the toner image) having moved to the surface of the photosensitive drum 31 are conveyed to a transferring position according to the rotation of photosensitive drum 31.

The transfer belt unit 40 includes a transfer belt 41 which is a semiconductive seamless belt (having a thickness of approximately 0.1 mm) supported by two metal rollers 43 and 44. The metal rollers 43 and 44 apply a tension of approximately 6 kg to the transfer belt 41 and cause transfer belt 41 to rotate. The metal rollers 43 and 44 are supported by bearings at the side walls of the transfer belt unit 40. A gear is fixed to one side of the metal roller 43 and is linked with a motor in the main body of the printing apparatus via gears. The transfer belt 41 is rotated by the rotation of the metal roller 43. The lenticular lens medium 10 having been conveyed by the supplying roller 71 to the image forming part 3 is further conveyed by the transfer belt 41 of the transfer belt unit 40. Transfer rollers 42 are disposed on the lower side of the transfer belt 41 in opposition to the photosensitive drums 31 of the developing device 30. Each of the transfer rollers 42 is a sponge rubber roller including a metal shaft and a semiconductive foam sponge rubber provided around the metal shaft, and both ends of the metal shaft are mounted to bearings at side walls of the transfer belt unit 40. The transfer rollers 42 are pressed against the photosensitive drums 31 via the transfer belt 41. This section is referred to as a transferring portion. Gears are fixed to one sides of the metal shafts of the transfer rollers 42, and are linked to a drive motor (not shown) of the main body of the printing apparatus via gears. The transfer rollers 42 rotate at a circumferential speed which is substantially the same as the circumferential speed of the photosensitive drum 31. When the transfer rollers 42 rotate, a voltage of approximately 1000-5000V is applied to the transfer rollers 42 by a high voltage power source device 421, and the voltage is determined by detecting a resistance value of the lenticular lens medium 10 so as to achieve suitable transferring efficiency.

Figure 6:
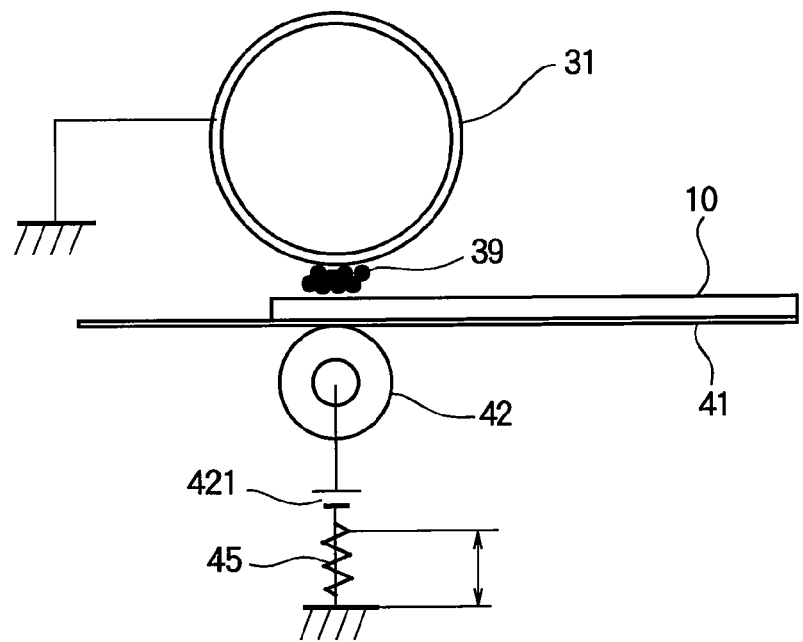
FIG. 6 is a schematic view showing a main part of the electrophotographic printing apparatus which performs the transferring process of the toner image in the printing operation on the lenticular lens medium according to the embodiment of the present invention.

The resistance value of the lenticular lens medium 10 can be obtained using a method shown in FIG. 6. In order to obtain the resistance value of the lenticular lens medium 10, a current $I_{TR}$ 46 flowing through a detection resistor R45 is determined by measuring an electric potential difference $V_{TR}$ of the detection resistor R45. The electric current is preliminarily measured in a state where the lenticular lens medium 10 has not yet conveyed to the transferring portion, and the electric current is measured in a state where the lenticular lens medium 10 is inserted into between the photosensitive drum 31 and the transfer belt 41, so that the resistance value of the lenticular lens medium 10 is determined. The determined resistance value is fed back to a controlling unit, and suitable voltage is applied to the transfer rollers 42. In this regard, a timing of starting the conveyance of the lenticular lens medium 10 by the supplying roller 71, a timing of light emission by the exposure device 32 of the image forming part 3, timings of starting rotations of and applying voltages to the charging roller 33, the photosensitive drum 31, the developing roller 37, and the toner supplying roller 35 of the developing device 30 are respectively controlled by the controlling unit according to the image pattern to be printed.

In the transferring process, the voltage applied to the transferring roller 42 is distributed according to the resistance value of the lenticular lens medium 10 and the resistance value of the toner image (i.e., the toner particles 39) on the photosensitive drum 31. The toner particles 39 are applied with a coulomb force generated by an electric field acting on the toner particles 39 caused by the applied voltage combined with another electric field in the opposite direction caused by the negatively charged toner particles 39 on the photosensitive drums 31. To be more specific, a force generated by the electric field due to the voltage applied by the transfer roller 42 acts on the toner particles 39 in one direction. Further, a force generated by the electric field due to the charged toner particles 39 on the photosensitive drum 31, an image force with respect to the photosensitive drum 31 and a liquid adhesive force with which the toner particles 39 adhere to the surface of the photosensitive drum 31 act on the toner particles in the opposite direction. These forces are combined and act upon the toner particles 39 forming the toner image. The toner particles 39 existing in a part where the Coulomb force caused by the transfer roller 42 is larger than other forces in the opposite direction are forced to move in the direction away from the photosensitive drum 31 toward the lenticular lens medium 10. Therefore, the toner particles 39 existing in a part where the electric field caused by the transfer roller 42 is large move from the photosensitive drum 31 toward the lenticular lens medium 10, so that the toner image formed by the toner particles 39 is transferred to the lenticular lens medium 10.

The above explanation has been given of the developing device 30 of black (K) as an example, but the image patterns of yellow (Y), magenta (M) and cyan (C) are formed using the respective developing devices 30. The developing devices 30K, 30Y, 30M and 30C are located at different positions, and therefore perform operations with respect to the lenticular lens medium 10 at compensated timings. The toner image patterns are formed on the lenticular lens medium 10 by the developing devices 30K, 30Y, 30M and 30C respectively.

Figure 8:
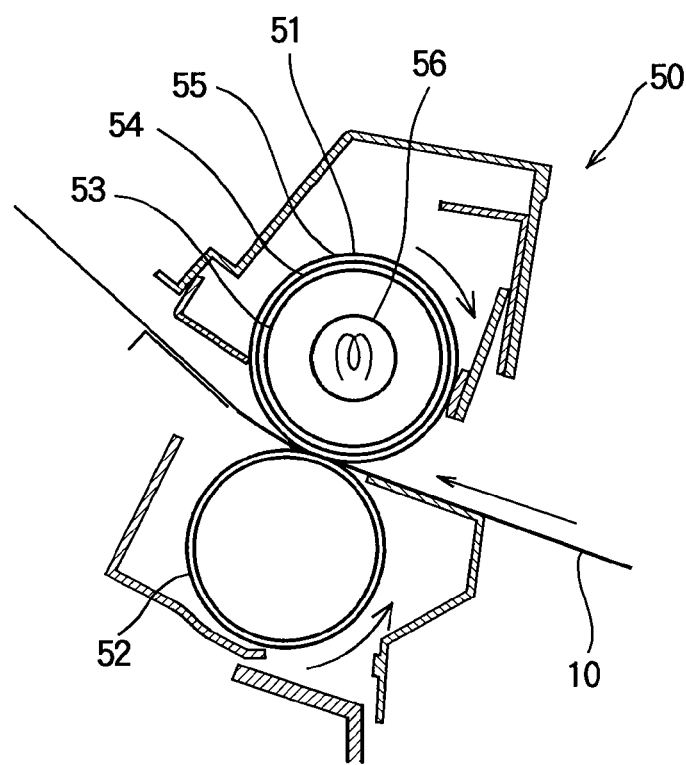
FIG. 8 is a schematic view showing an example of a fixing device used in the fixing process in the printing operation on the lenticular lens medium according to the embodiment of the present invention.

In order to fix the toner image to the lenticular lens medium 10 so as to obtain a usable printing material, the fixing device 50 applies heat and pressure to the toner image so as to cause the toner particles thereof to melt and be fixed to the lenticular lens medium 10. FIG. 8 is a schematic view showing the fixing device 50 of the printing apparatus. The fixing device 50 includes a fixing roller 51 on the upper side and a backup roller 52 on the lower side. The fixing roller 51 includes a halogen lamp 56 at a center portion thereof. The halogen lamp 56 is applied with AC voltage to emit light and heat. The fixing roller 51 further includes a thin iron pipe 53 (having a thickness of 0.15 mm) around the halogen lamp 56 for providing intensity and reducing heat resistance. The fixing roller 51 further includes a thin silicone rubber layer 54 (having a thickness of 1 mm) for providing contact width and reducing heat resistance, and a fluorine coating layer 55 (having a thickness of 0.05 mm) having an excellent toner releasability.

The fixing device 50 applies heat and pressure to the unfixed toner image on the lenticular lens medium 10, so as to cause the toner particles 39 to melt and be fixed to the lenticular lens medium 10. The lenticular lens medium 10 with the toner image of the toner particles 39 having been fixed by the heat fixing process is conveyed from the fixing device 50 toward the medium ejection/stacking part 60. A pair of ejection rollers 61a and 61b eject the lenticular lens medium 10 out of the main body of the printing apparatus so that the lenticular lens medium 10 is stacked on the medium ejection/stacking part 60.

The configuration of the electrophotographic printing apparatus for printing images on the lenticular lens medium 10 and the printing operation have been described. Conventional printing methods such as offset printing, silk printing, photogravure printing or typeset printing use ink. Therefore, it takes time to dry the ink, and it is necessary to provide an ink absorption layer on a surface of a printing medium. In the case where the ink absorption layer is not provided, it is necessary to print an image on a paper medium, and to paste the paper medium to the lenticular lens medium. In order to correctly align the paper medium and the lenticular lens medium for bonding, it is necessary to use a tool or instrument for alignment. Even if the ink jet printer is capable of obtaining stereoscopic image processed using a personal computer or the like, it is still necessary to provide the ink absorption layer or to perform the pasting operation of the paper medium as is the case with the offset printing or the like.

Using the lenticular lens medium 10 according to this embodiment, the electrophotographic printing apparatus is able to form the stereoscopic image (having been processed using the personal computer or the like) as the toner image directly on the lenticular lens medium 10, and to thermally fix the toner image to the lenticular lens medium 10. Therefore, it is possible to provide the lenticular lens medium at low cost, without the need for an ink absorption layer. Further, it is possible to easily provide a printing material with high quality and high resolution stereoscopic image at high speed and at low cost.

Here, problems of general lenticular lens medium will be described. The general lenticular lens medium lacks electric conductivity, with the result that a transferring efficiency of the toner image is insufficient, and that ripple or deformation tends to occurs.

First, a volume resistivity of a paper medium generally used in electrophotographic process is in a range of $10^8$ to $10^9 \Omega \cdot cm$. Since the thickness of such paper medium is in a range of 0.08 to 0.121 mm, a resistance value by unit area of the paper medium is in a range of $10^7$ to $10^8 \Omega$. In contrast, the general lenticular lens medium is formed of transparent resin material such as PET resin or PMMA resin or the like. Such resin materials are generally insulators, and has resistivity substantially as high as that of air, so that the volume resistivity thereof is at least $10^{15} \Omega \cdot cm$. The general lenticular lens medium has a thickness of 0.2-0.3 mm, and therefore the resistance value by unit area of the general lenticular lens medium is at least $10^{15} \Omega$. The toner in the image forming part 3 has a volume resistivity of $10^{11}$-$10^{13} \Omega \cdot cm$. The volume occupancy rate of the toner is in a range of 30 to 40%, and therefore the toner particles do not contact each other and leave a space of air in the toner layer. This space is herein referred to as a toner layer airspace. Therefore, when the toner layer has a thickness of 25 µm, the resistance value by unit area is at least $10^{14} \Omega$.

The high voltage applied to the transfer rollers 42 in the transferring process is distributed according to the ratio between the resistance of the toner layer (the toner layer airspace) and the resistance of the lenticular lens medium. The general lenticular lens medium has a large volume resistivity, and therefore the voltage is applied to the lenticular lens medium, while the voltage is hardly applied to the toner layer airspace including the toner image. Therefore, the toner layer airspace including the toner image is not applied with the transferring electric field, so that the toner image is hardly transferred to the lenticular lens medium and a sufficient printing density is not obtained.

As a countermeasure, it has been proposed to add a surfactant to the resin material so as to reduce a resistance of the resin material. In such a case, the added surfactant is distributed in the vicinity of the surface of the resin material, and is gradually bled out to form an electrical conductive layer on the surface of the resin material to thereby reduce the surface resistance value. However, although the surface resistance of the resin material is reduced, the resistance inside the resin material is not reduced. Therefore, when such resin product is used as the lenticular lens medium in the electrophotographic printing apparatus, almost all of the voltage is applied to the lenticular lens medium (due to high resistance inside the resin material forming the lenticular lens medium), and is not applied to the toner layer airspace including the toner image. As a result, the Coulomb force acting in the direction from the photosensitive drum 31 to the lenticular lens medium becomes small, so that the toner particles are hardly transferred to the lenticular lens medium.

In order to obtain sufficient conductivity, carbon is typically used as a conductive agent. However, if such carbon is used, a transparency required for the lenticular lens medium is not ensured. Although there are other white conductive agents such as oxidized zinc, oxidized titanium, ITO and ATO, these conductive agents cause reduction in transparency due to the difference in refractive index with resin material. Further, these conductive agents are unusable due to cost and for environmental reason or the like.

As described above, the general lenticular lens medium have no electric conductivity, and therefore the toner of the toner image is not transferred to the lenticular lens medium or the transferring amount of the toner is very small in the transferring process. That is, the transferring efficiency is low. Therefore, the density of the image pattern transferred to the lenticular lens medium is low and contains partial irregularities, with the result that an excellent image quality is not obtained.

Relationship between the resistivity of the lenticular lens medium and the transferring property will be described in detail. A high voltage supplied by the high voltage source device for transferring is distributed to the transfer roller 42, the transfer belt 41, the lenticular lens medium, the photosensitive drum 31 and the toner layer airspace including the toner image formed on the photosensitive drum 31. The transfer roller 42, the transfer belt 41 and the photosensitive drum 31 (i.e., except the lenticular lens medium and the toner layer airspace) have relatively low resistivity, and the majority of the voltage is distributed to the lenticular lens medium and the toner layer airspace. Here, the voltage applied to the toner layer airspace is expressed as Va, and the thickness of the toner layer airspace is expressed as $\Delta t$. The intensity of the electric field applied to the toner layer airspace is $Ea=Va/\Delta t$. Further, if the electric charge of the toner is expressed as q, the Coulomb force is $Fa=q \times Va/\Delta t$. In contrast, the force (Ft) due to the electric field created by the charged toner, the image force (Fi) with respect to the photosensitive drum 31 and the liquid adhesive force (Fl) are applied to the toner in the direction toward the photosensitive drum 31, which is opposite to a direction in which the toner adheres to the lenticular lens medium. The toner which is applied with a positive Coulomb force Fa moves from the photosensitive drum 31 to the lenticular lens medium, and adheres to the lenticular lens medium. Therefore, the amount of the toner adhering to the lenticular lens medium becomes large as the volume resistivity of the lenticular lens medium decreases.

In this regard, the amount of the toner transferred to the lenticular lens medium can be increased by increasing the voltage of the transferring power source device. However, a high voltage power source device of 5-7 kV is presently used, and a higher transfer voltage is inadvisable in terms of safeness and cost effectiveness. Therefore, this embodiment provides the lenticular lens medium 10 with the volume resistivity lower than or equal to $10^{14} \Omega \cdot cm$, and more preferably lower than or equal to approximately $10^{12} \Omega \cdot cm$. With such a configuration, the toner image on the photosensitive drum 31 is almost entirely transferred to the lenticular lens medium 10, so that a toner image with sufficient printing density and with high image quality can be obtained.

Figure 7:
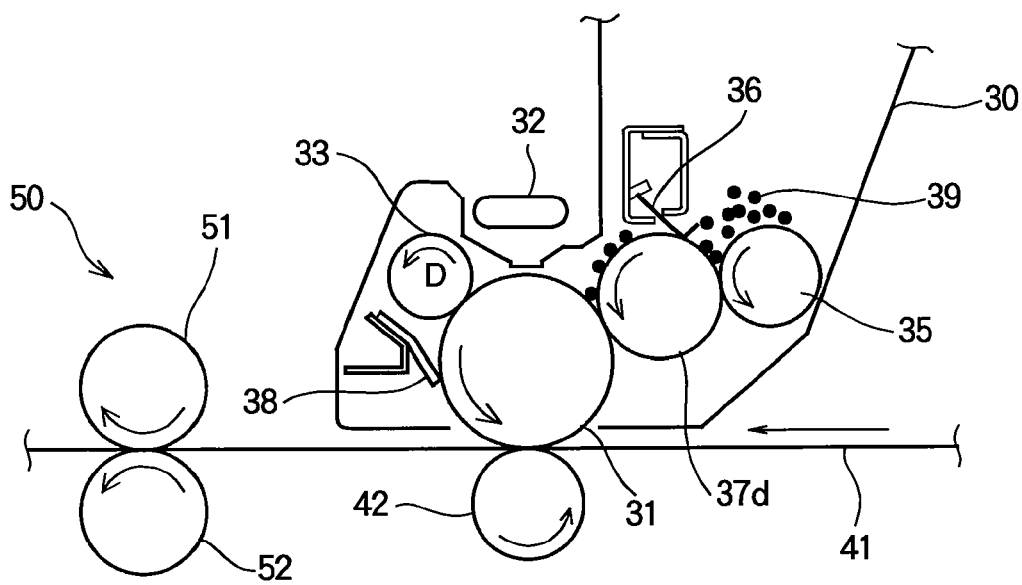
FIG. 7 is a schematic view showing a main part of the electrophotographic printing apparatus which performs the transferring process and the fixing process of the toner image in the printing operation on the lenticular lens medium according to the embodiment of the present invention.

The fixing device 50 shown in FIG. 7 is an apparatus that causes the toner particles (forming the toner image) on the lenticular lens medium 10 to melt and be fixed to the lenticular lens medium 10. The surface temperature of fixing roller 51 is set in a range of 150 to 180° C., so that the toner particles thermally melt. The heat is also supplied to the surface of the lenticular lens medium 10 so that the surface temperature thereof increases. The surface temperatures of the lenticular lens medium 10 and the toner particles are determined based on a temperature of the fixing roller 51, a pressure applied by the fixing roller 51 and the backup roller 52, a contact width therebetween, a printing speed, thermal property of the lenticular lens medium 10 (such as heat resistance or heat conductivity) and the like. In this regard, if the surface of the lenticular lens medium melts depending on the conditions for melting the toner particles, the lenticular lens medium may be rippled, deformed or warped. In such a case, an excellent printing medium can not be obtained. Therefore, it is necessary to obtain a heat-resistant lenticular lens medium and to determine printing conditions that do not cause ripple and deformation of the lenticular lens medium.

As shown in FIG. 1, the lenticular lens medium 10 of this embodiment includes a plurality of semicylindrical-shaped and arc-shaped elongated convex parts. The lenticular lens medium 10 includes the concavo-convex surface 15 on which linear convex lenses are arranged, and the flat printing surface 16. The lenticular lens medium is formed of a resin material having the volume resistivity of $1 \times 10^7 - 1 \times 10^{14} \Omega \cdot cm$ and the surface resistivity of $1 \times 10^8 - 1 \times 10^{15} \Omega/\square$ between the concavo-convex surface 15 and the flat printing surface 16 as described later.

In this embodiment, the material of the lenticular lens medium 10 having the volume resistivity of $1 \times 10^7 - 1 \times 10^{14} \Omega \cdot cm$ and the surface resistivity of $1 \times 10^8 - 1 \times 10^{15} \Omega/\square$ can be formed of, for example, a hydrophilic polymer composed of a polymer graft-copolymerized, a thermoplastic resin and an anionic surfactant. The polymer is polymerized with 5-95 weight parts of one or more kinds of an ethylenically unsaturated monomer onto 5-95 weight parts of a rubber trunk polymer, within 100 weight parts in total of the rubber trunk polymer and the ethylenically unsaturated monomer. The rubber trunk polymer includes 50-95 weight % of one or more kinds of a monomer (i) selected from a conjugated diene and/or an acrylic ester, 5-50 weight % of one or more kinds of a monomer (ii) having 4-500 alkylene oxide groups and further having an ethylenically unsaturated bond, and 0-40 weight % of one or more kinds of a polymerizable ethylenically unsaturated monomer (iii), which is polymerizable with the conjugated diene and/or the acrylic ester.

The lenticular lens medium 10 contains the polymer graft-copolymerized as the hydrophilic polymer. The lenticular lens medium 10 can be preferably composed of (a) 3-100 weight parts of a hydrophilic polymer comprising a polymer graft-copolymerized, (b) 0-97 weight parts of a thermoplastic resin within 100 weight parts in total of (a) and (b), and (c) 0.1-5 weight parts of an anionic surfactant. In particular, when 5-80 weight parts (more preferably, 10-60 weight parts) of the rubber trunk polymer is contained with respect to 100 weight parts in total of the hydrophilic polymer (a) and the thermoplastic resin (b), sufficient volume resistivity and surface resistivity can be obtained.

The thermoplastic resin (b) used together with the hydrophilic polymer (a) may be any arbitrary thermoplastic resin, and examples thereof are as follows: polyethylene, polypropylene, polystyrene, polyethylene terephthalate, polyvinyl chloride, polyvinylidene chloride, aromatic vinyl polymers, nitrile resins, (meth)acrylic resins composed of homopolymers or copolymers of (meth)acrylate esters, ABS resins, acrylonitrile-styrene resins, polycarbonate, polyamide resins, polyimide resins, polyester resins, fluorine-containing resins. It is preferable to use a resin having good compatibility with hydrophilic polymer. It is preferable to use an aromatic resin which does not substantially contain aromatic polymer component. More preferable examples of the thermoplastic resin (b) are, for example, (meth)acrylic resins.

Furthermore, in order to obtain a lenticular lens medium with especially high transparency, it is preferable to use an acrylic acid ester as the monomers (i) and (iii). The anionic surfactant is preferably one or more kinds selected from a group consisting of alkyl benzene sulfonic acid salts, alkyl naphthalene sulfonic acid salts, perfluoro alkyl sulfonic acid salts, trifluoromethane sulfonic acid salts, and fatty acid salts. The anionic surfactant is preferably an alkali metal salt using metal atoms having an atomic number of not less than 19 (corresponding to potassium), and having an initiation temperature of weight loss defined by JIS-K7120 is 250° C. or more. The amount of the anionic surfactant is preferably 0.1-5 weight parts.

A conventional anti-static conductive resin is given electric conductivity mainly by anti-static agent existing on the surface of the resin, and therefore the electric conductivity is reduced by washing or wiping. However, the lenticular lens medium of this embodiment exhibits permanent conductivity. Further, the conductivity is generated in the thickness direction of the lenticular lens medium. While a mechanism thereof has not been fully clarified as yet, it is conceivable that a rubber trunk polymer comprises a monomer selected from a conjugate diene or acrylic acid ester, and further the monomer contains alkylene oxide groups, as well as such rubber trunk polymer is dispersed into graft component resin or a mixture of graft component resin and the thermoplastic resin as a matrix component in the form of mutual bridge at the time of processing. Further, a surfactant added thereto is selectively adsorbed principally by the rubber trunk polymer, so that electric charge moves principally through rubber trunk polymer adsorbing the surfactant, thereby dissipating and attenuating.

Furthermore, since the rubber trunk polymer contains a monomer having alkylene oxide groups, mobility of electric charge remarkably increases, and the effect of addition of surfactant remarkably increases. Further, conventionally, the movement of electric charge is concentrated in the vicinity of the surface, and the electric charge easily moves in a direction parallel to the surface, so that the surface resistivity of the resin decreases, but the volume resistivity in the thickness direction does not decrease. However, according to the present invention, the volume resistivity in the thickness direction decreases and consequently the surface resistivity also decreases, but the surface resistivity is relatively large compared with the volume resistivity because the electric charge does not easily flow in the surface direction. The small volume resistivity and large surface resistivity are properties required in a lenticular lens medium to be used with electrophotographic printing apparatus, and the lenticular lens medium according to the present invention satisfies these properties.

Here, a manufacturing process of the lenticular lens medium 10 according to this embodiment will be described as well as experimental examples using pellets, plate-like sheets and the lenticular lens media. First, the above described hydrophilic polymer, the aromatic thermoplastic resin, the anionic surfactant and other necessary additive material were mixed in a Herschel mixer. The resultant powder was formed into pellets using a parallel twin-type screw extruder having a cylinder diameter of 20 mm named "Labo PlastoMill" (manufactured by Toyo Seiki Seisaku-sho Ltd).

The pellets were molded using an injection forming machine "IS-80EPN" (manufactured by Toshiba Machinery Co., Ltd). A flat mold having a length (L) of 100 mm, a width (W) of 50 mm and a thickness (T) of 3 mm was attached to the injection forming machine. Molding was performed under the condition that a temperature of the cylinder was 220° C., a temperature of the mold was 40° C. and a retention time of resin in the cylinder was 40 seconds. The resultant plate-like sheet was washed using supersonic for 15 minutes, and dried out in an oven at 40° C. for 30 minutes. After the drying was completed, the volume resistivity and the transparency of the plate-like sheets were measured.

Using the above method, the plate-like sheets having different volume resistivity were manufactured by varying the content of the hydrophilic polymer in a range of 15 to 92 weight %, a ratio between the hydrophilic polymer and the thermoplastic resin and the content of the anionic surfactant in a range of 0.1 to 5 weight %. Using the plate-like sheets, the relationship between the volute resistivity, the surface resistivity and the transparency in relation to the contents of the hydrophilic polymer, the thermoplastic resin and the anionic surfactant was determined.

10 plate-like sheets having different volume resistivity in a range of $10^7$ to $10^{15}$ Ω·cm were formed by selecting the contents of the hydrophilic polymer, the thermoplastic resin and the anionic surfactant. Using these plate-like sheets, the lenticular lens media having different resistivity were manufactured. Then, image patterns were formed on the lenticular lens media using the electrophotographic printing apparatus. Then, transferring property (i.e., printing density), fixing property (i.e., fixing rate), heat resistance property (i.e., warping of the lenticular lens medium or the like), glossiness and image level or the like were measured.

Measurement of the volume resistivity was performed based on JIS (Japanese Industrial Standard) K 6911 and using "Hiresta UP MCP HT450" (manufactured by Dia Instruments Co., Ltd). The lenticular lens medium has the concavo-convex surface (i.e., convex lenses), and the volume resistivity thereof cannot be correctly measured. Therefore, the volume resistivity was measured using the plate-like sheets having the same composition as the lenticular lens media. Using the same plate-like sheets, the surface resistivity was also measured using the same measurement device ("Hiresta UP MCP HT450"). The measurement was performed at a temperature of 23° C. and at a humidity of 55%. Further, optical transmittance of the plate-like sheets was measured using a spectrometer "SE-2000" (Nippon Denshoku Industries Co., Ltd.).

The transferring property was evaluated by measuring printing density. Using an electrophotographic printer named "Microline Pro-9800 PS-E" (manufactured by Oki Data Corporation), solid images of respective colors were printed on the lenticular lens media, and then the densities of the images were measured using a densitometer "X-Rite 528" (manufactured by X-Rite Incorporated).

The fixing rate (i.e., the fixing property) was measured as follows. Adhesion tapes ("Cellophane Tape" manufactured by Nichiban Co., Ltd.) having the length of 18 mm were attached to the solid images of respective colors printed to the lenticular lens media (by the above described electrophotographic printing apparatus) at a linear pressure of 300 g/cm. Then, the adhesion tapes were peeled off from the solid images at a speed of 10 mm/s. Thereafter, a ratio (referred to as OD ratio) of the image density before the peeling to the image density after the peeling was measured. The glossiness was determined by measuring the solid images of respective colors printed on the lenticular lens media using "Microgloss 75°" (manufactured by Gardner Incorporated).

From the results (shown in FIG. 13) of examples, it was found that the range of the volume resistivity of the lenticular lens medium providing a sufficient transferring property is in a range of $10^7$ to $10^{14}$ Ω·cm. Under high temperature and high humidity, when the toner images are transferred to the lenticular lens medium from the photosensitive drums 31 of two adjacent developing devices at the same time, the current may flow through the transfer roller 42 of the adjacent developing device if the surface resistivity of the lenticular lens medium is lower than $10^8$ Ω/□, and transferring failure may occur. For this reason, the surface resistivity of the lenticular lens medium is preferably in a range of $10^8$ to $10^{15}$ Ω/□.

Next, measures for enhancing the fixing property and the heat resistance property in the fixing process will be described. In the fixing process, the fixing roller 51 and the backup roller 52 rotate in contact with each other in order to fix the toner image to the lenticular lens medium. The toner particles of the toner image melt due to heat from the fixing roller 51 when the lenticular lens medium passes through the contact portion between the fixing roller 51 and the backup roller 52, and is fixed to the lenticular lens medium after the lenticular lens medium passes the contact portion. When the lenticular lens medium passes the contact portion, heat is also supplied to the lenticular lens medium and causes the temperature of the lenticular lens medium to increase, with the result that the lenticular lens may be rippled or deformed depending on the increased temperature. The amount of heat that can be applied to the lenticular lens medium is influenced by the setting of the temperature of the fixing roller 51 (which relates to the melting point of the toner particles), the printing speed, the contact width with fixing roller 51 and the pressure between the fixing roller 51 and the backup roller 52, and also influenced by the heat resistance temperature, the thickness and the heat conductivity of the lenticular lens medium in terms of the heat resistance property.

The heat resistance temperature of the lenticular lens medium is 70° C. or higher according to the heat resistance property thereof as described later regarding the experimental results. This temperature is the heat resistance temperature of general thermoplastic resins. Therefore, general thermoplastic resin materials can be used in this temperature range. The lenticular lens medium preferably has a thickness of 0.3 mm or thicker. Regarding the conditions of the printing apparatus, when the printing speed is 10 PPM (Page Per Minute) or faster (i.e., when the feeding speed of the lenticular lens medium is 45 mm/sec or faster), an excellent image printing can be obtained without causing ripple and deformation of the lenticular lens medium. If the thickness of the lenticular lens medium is thicker than 3 mm, the printing apparatus may not perform printing operation satisfactorily.

On the above described conditions, using the lenticular lens medium 10 having the volume resistivity of $10^7$-$10^{14}$ Ω·cm, the surface resistivity of $10^5$-$10^{15}$ Ω/□ and the medium thickness of 0.3-3 mm, and which is composed of resin whose heat resistance temperature is 70° C. or higher, and using the electrophotographic printing apparatus where the feeding speed of the lenticular lens medium is 45 mm/sec or faster and the setting of the fixing temperature is not more than 190° C., an excellent image can be formed.

When the printing is performed on the above described conditions, the toner image formed on the photosensitive drum 31 is substantially entirely transferred to the lenticular lens medium 10, and the toner particles of the toner image sufficiently melt and are fixed to the lenticular lens medium 10 by means of the fixing device 50 without causing the ripple and deformation. Therefore, an excellent printing image can be obtained. As a result, using the electrophotographic printing apparatus that forms toner image, the lenticular lens medium capable of providing stereoscopic images and moving images without the use of spectacles can be obtained.

There are cases where the transparency of the lenticular lens medium may decrease due to clouding or discoloring caused by gaseous pollutants. This is solved by adding 0.001-0.5 weight parts of divalent or polyvalent metal salts containing Ca, Al or the like to 100 weight parts of the resin. Examples of divalent or polyvalent (more preferably divalent to quadrivalent) metal salts are: alkali earth metal salts such as magnesium chloride, calcium chloride, magnesium oleate, calcium stearate, IIIA metal salts such as aluminum chloride, aluminum stearate, and metal oxides such as titanium oxide, zinc oxide and tin oxide.

The resin of the lenticular lens medium and the resin of the toner are generally composed of different materials, in order to obtain a better printing image. In such a case, in the fixing process, the fixing property of the resin of the toner with respect to the lenticular lens medium may be poor, and the surface of the toner particles may become uneven. Therefore, due to light scattering, a sufficient transparency is not obtained. This is solved by providing a coating layer of transparent resin (referred to as a toner receiving layer) having a thickness of approximately 1-10 μm uniformly on the surface of the lenticular lens medium. The coating layer is preferably made of resin having the composition of the same kind as the binder resin of the toner so as to obtain good compatibility with the toner. With such a configuration, a relatively high fixing property can be obtained.

The provision of the uniform toner receiving layer has the above described advantage, because softening and melting of the toner receiving layer occur at the same time as the melting of the resin of the toner in the fixing process. The toner particles whose mean particle diameter is in a range of 7 to 8 μm are embedded in the toner receiving layer (i.e., the transparent resin coating layer). Therefore, thin lines of the toner image are prevented from being collapsed by pressurization, and therefore a fixed image with high resolution can be obtained. The surface of the toner receiving layer is flat and smooth in accordance with the surface of the fixing roller, and therefore light scattering due to the unevenness of the surface is reduced, so that highly transparent image can be obtained.

The binder resin of the toner can be the transparent resins such as polyester resins or styrene acrylate resins, and can be obtained by polycondensation of polyester resin, aromatic or fatty dicarboxylic acid monomer and aromatic or fatty diol monomer. Examples of carboxylic acids are as follows: terephthalic acid, isophthalic acid, naphthalene carboxylic acid, trimellitic adipic acid, sebacic acid and eicosanoic diacid. Examples of diol monomers are as follows: ethylene glycol, propane diol, 1.4-butane diol, 1.6-hexane diol, neopentyl glycol and others. The resin of the toner receiving layer (compatible with the resin of the toner) can be preferably the above described polyester resin or styrene acrylate resin. The resin is dissolved and dispersed in water or (if needed) organic solvent or mixed liquid of methanol, ethanol, propanol, isopropyl alcohol, acetone or the like with water, so as to obtain a coating liquid. The coating liquid is applied to the surface of the lenticular lens medium, and volatile part thereof is vaporized and dried, with the result that the resin coating layer (i.e., the toner receiving layer) is formed. The application of the coating liquid to the surface of the lenticular lens medium is performed using known coating methods such as comma coating, air knife coating, die coating, blade coating, reverse roll coating, gravure coating and spray coating. Depending on the coating method, leveling agent or dispersing agent can be added to the coating liquid. The thickness of the toner receiving layer is necessarily in a range of 1 to 10 μm.

The lenticular lens medium generally possesses the property of easily absorbing ultraviolet rays (UV). Therefore, when the lenticular lens medium is placed in direct sunlight for the purpose of advertisement or display, the lenticular lens medium is exposed to ultraviolet rays, so that the resin of the lenticular lens medium or the toner receiving layer may be discolored or degraded due to effect of ultraviolet rays. Accordingly, UV absorbents or optical stabilizers can be added to the lenticular lens medium or the toner receiving layer so as to provide blocking action of ultraviolet rays. The addition of the UV absorbents or optical stabilizers can be performed in the forming process of the lenticular lens medium or in the preparing process of the coating liquid for forming the toner receiving layer. By adding the UV absorbents or optical stabilizers to the lenticular lens medium or the toner receiving layer, the degradation and discoloration thereof can be prevented.

Ultraviolet rays contained in sunlight have damaging effect on plastics or the like and may cause coloration, discoloration or degradation. The UV absorbents absorb ultraviolet rays so as to enhance long-term weather resistance and stability of plastics. There are following types of usable UV absorbents: benzotriazole, benzophenone, salicylate, cyanoacrylate, nickel and triazine. The optical stabilizers effectively capture and stabilize the free radicals resulting from energy of ultraviolet rays. For example, hindered amine optical stabilizers (HALS) can be used. HALS can be used together with UV absorbents, and cause a synergistic effect so as to enhance the weather resistance.

It is demanded to protect the printed image on the lenticular lens medium from scratching, spillage of water or alcohol, defacement by ink, discoloring, blocking and other changes or actions that degrade the printed image. For this purpose, it is possible to provide a surface protection film or to form a protection layer. It is also possible to provide an adhesive layer as a part of the surface protection film. As a substrate of the surface protection film, it is possible to use a transparent sheet such as a transparent film (for example, polyester resins, acetate resins, polyether sulphone resins, polycarbonate resins, polyamide resins, polyimide resins, polyolephin resins or acrylic resins), a rubber sheet or a laminate body of the transparent film and the rubber sheet based on conventional protection films. The thickness of the protective film can be, for example, in a range of 10 to 200 μm. The adhesive layer can be made using suitable adhesive materials or adhesive agents. The adhesive agents can be formed using, for example, acrylic copolymer, silicone polymer, polyester, polyurethane, polyamide, polyether, fluorine polymer and rubber polymer and other suitable polymers as base polymer. In particular, it is preferable to use acrylic adhesive that provides excellent transparency, weather resistance and heat resistance. It is also possible to attach the surface protection film to the printing surface of the lenticular lens medium using hot laminate or cold laminate. It is also possible to coat the surface protection film on the printing surface of the lenticular lens using coating methods such as over coating, bar coating, spraying, knife coating or roll coating, or using printing methods such as gravure, typographical printing. It is also possible to use ultraviolet curable resin as the protection layer.

It is also possible to add additives such as antioxidants, lubricants, fillers and pigments to the lenticular lens medium of this embodiment. The additives can be added to the lenticular lens medium in any one of the polymerization process, mixing process and forming (molding) process.

Next, the lenticular lens medium according to this embodiment will be described in detail based on examples that the inventers performed.

First, the hydrophilic polymer was manufactured using a pressure resistant reaction container provided with an agitator, a thermometer and a pressure gauge. The following materials were put in the pressure resistant reaction container.

| Materials of a rubber trunk polymer: | |
|---|---|
| 1,3 butadiene (i): | 23 weight parts |
| butylacrylate (i): | 30 weight parts |
| methoxypolyethylene glycol (ii): (number of ethylene oxide groups is an integer of 23 in average) | 12 weight parts |
| t-butyl hydroperoxide: | 0.03 weight parts |
| sodium formaldehyde sulfoxylate: | 0.015 weight parts |
| ethylenediamine tetraacetic acid iron (iii) salt: | 0.0015 weight parts |
| sodium pyrophosphate: | 0.2 weight parts |
| oleic acid potassium salt: | 2.0 weight parts |
| deionized water: | 200 weight parts |

These materials were agitated for 10 hours at 60° C. As a result, a latex (as the rubber trunk polymer) whose mean particle diameter is 80 nm was obtained at yield rate of 99%. With respect to 65 weight parts (solid content) of the latex as the rubber trunk polymer, the following mixtures for unsaturated ethylene monomer were added:

| methyl methacrylate: | 35 weight parts |
|---|---|
| normal octyl mercaptan: | 0.3 weight parts |
| t-butyl hydroperoxide: | 0.2 weight parts |
| sodium formaldehyde sulfoxylate: | 0.02 weight parts |
| oleic acid potassium salt: | 1.0 weight parts |
| deionized water: | 50 weight parts |

These materials were mixed for 10 hours at 60° C. after nitrogen substitution to yield a polymer graft-copolymerized. Then, the latex was taken out, and was added with 200 weight parts of hydrochloric solution (at a concentration of 0.7 weight %), so as to cause precipitation. After dewatering and washing, a polymer graft-copolymerized in the form of damp powder whose moisture content is 43 weight % was obtained. The polymer graft-copolymerized was dried out in a flush dryer using heated air at a temperature of 100° C. so as to obtain a hydrophilic polymer (i.e., a polymer graft-copolymerized) in the form of white powder at yield rate of 97%.

Then, 15-92 weight parts of the resultant hydrophilic polymer (10-60 weight parts of the rubber trunk polymer), 8-85 weight parts of methacryl resin having refractive index of 1.49 ("Sumipex B-MHG" manufactured by Sumitomo Chemical Co., Ltd.), 0.1-5 weight parts of dodecylbenzenesulfonic acid potassium salt (anionic surfactant) having initiation temperature of weight loss (Tng) of 430° C. and 0.05 weight parts of calcium chloride (high-grade reagent, manufactured by Wako Pure Chemical Industries Ltd.) were mixed in the Herschel mixer. The resultant powder was formed into pellets using the parallel twin-type screw extruder whose cylinder radius is 20 mm ("Labo PlastoMill" manufactured by Toyo Seiki Seisaku-sho Ltd). As a result, resin pellets for Examples 1 to 8 and Comparative Example 1 were obtained.

In order to measure physical properties of products, plate-like test pieces (i.e., plate-like sheets) were formed as follows. The above described pellets were molded using the injection forming machine "IS-80EPN" (manufactured by Toshiba Machinery Co., Ltd) with the mold having the length (L) of 100 mm, the width (W) of 50 mm and the thickness (T) of 3 mm. The resultant plate-like molded body was washed using supersonic in extra-pure water for 15 minutes, and dried out in an oven at 40° C. for 30 minutes, so as to obtain test pieces. Then, the volume resistivity, the surface resistivity and the transparency of the test pieces were measured.

Figure 9:
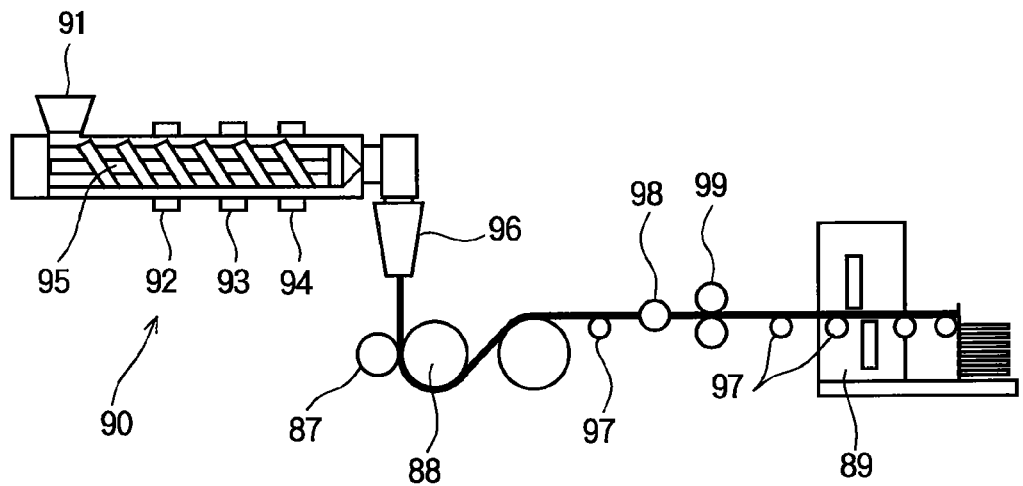
FIG. 9 is a schematic view for illustrating a manufacturing process of the lenticular lens medium according to the embodiment of the present invention.

Here, a manufacturing method of the lenticular lens medium 10 from the pellets will be described with reference to FIG. 9. The pellets are put into a single-axis extruder 90 via a hopper 91. In the extruder 90, the pellets are fed by a screw 95. The extruder 90 has three barrels 92, 93 and 94 for heating the pellets fed by the screw 95. The temperature of the barrel 92 closest to the hopper 91 is set to 170° C., the temperature of the intermediate barrel 92 is set to 210° C., and the temperature of the barrel 93 closest to the tip of the extruder 90 is set to 230° C. By the rotation of the screw 95, the resin melts and is kneaded, and is extruded from the tip of the extruder 90. The extruded resin is introduced to a T-die 96, and is extruded from the T-die 96 as a sheet-like resin having predetermined width and thickness. The temperature of the T-die 96 is set to 230° C. Although the T-die 96 is suitable for producing the plate-like sheet, this embodiment is not limited to this method, and it is possible to use other method.

A roller 87 is provided for forming the linear convex lenses of the lenticular lens medium 10 of this embodiment. The roller 87 has concaves (not shown) on the circumferential surface thereof extending in circumferential direction (i.e., rotational direction) of the roller 87, so as to form the linear convex lenses of the linear lens medium 10. Another roller (i.e., a mirror surface roller) 88 is disposed facing the roller 87, and has a uniform mirror circumferential surface. The gap between the rollers 87 and 88 is adjusted according to the thickness of the sheet-like resin. By continuously extruding the sheet-like resin through between the rollers 87 and 88, a web-like lenticular lens medium sheet can be obtained. The resultant web-like lenticular lens medium sheet is fed through guide rollers 97, a trimming apparatus 98 and pinch rollers 99, and is cut by a cutter 89. The cutter 89 cuts the web-like lenticular lens medium sheet in a direction perpendicular to the feeding direction of the lenticular lens medium sheet at predetermined intervals, so as to obtain sheet-like lenticular lens media 10 are obtained.

Figure 10A:
FIGS. 10A and 10B are a front view and a plan view showing an example of the lenticular lens medium according to the embodiment of the present invention.
Figure 10B:
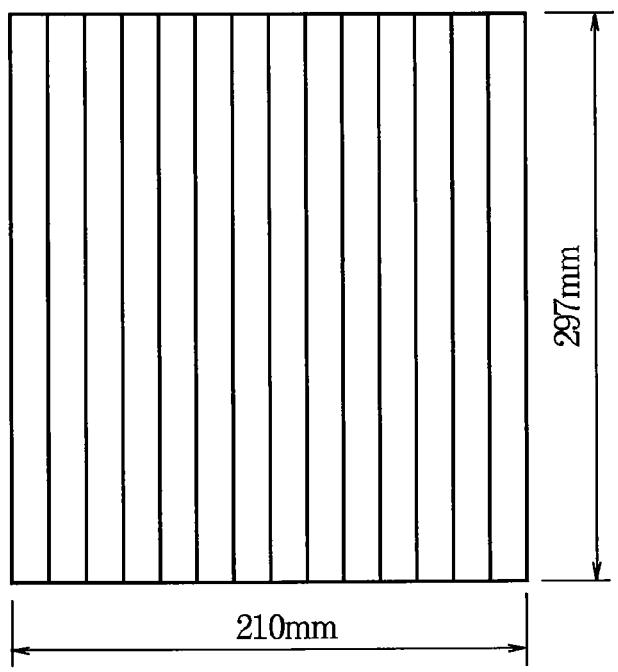

The sizes of the lenticular lens medium after cutting are, for example, A0 through A10 formats of A series (A0: 841 mm×1189 mm), B0 through B10 formats of B series (B0: 1030 mm×14561 mm), full size to Sextodecimo size of Kikuban format (939 mm×636 mm), full size to octavo size of duodecimo format (1091 mm×788 mm), as well as special sizes such as stretched A3 size (328 mm×453 mm), A3 wide size (329 mm×530 mm) and the like, which are generally used in Japan. There are also sizes used in other countries, for example, letter size, tabloid size, legal size and the like which are generally used in United States of America and the like. The size of the lenticular lens medium can be arbitrarily set. Further, it is possible to use the lenticular lens media of the same size in such a manner that the longitudinal direction is oriented vertically (FIGS. 10A and 10B) or horizontally (FIGS. 11A, 11B). In these cases, it is possible to use the lenticular lens media 10 of the same size (for example, A4 size) whose extending directions of linear convex lenses are different from each other by 90 degrees (FIGS. 10B and 11B). Further, as shown in FIG. 12, it is also possible to divide a large-size medium 110 into a number of small-sized media 112 of, for example, card size. By performing printing on the small-sized media 112 at the same time, efficiency and cost of production can be enhanced. In this case, cuts 111 are made around the small-sized media 112 leaving several connecting portions 113 for supporting each small-sized media 112 so that the connecting portions 113 can be broken with application of force.

The lenticular lens medium is extruded so as to have a width (before cutting) which is wider than a target width by 10-30 mm on each side. It is also possible to cut the lenticular lens medium into a plurality of media in the widthwise direction depending on the target size. The type (shape) of the lenses (i.e., linear convex lenses) can be varied according to use, effect (such as, stereoscopic vision, video, 2-dimensional vision and 3-dimensional vision), focal length and size. As shown in FIG. 1, the shape of the lenses is determined by the lens pitch Lp, the lens radius R and the medium thickness T. The linear convex lenses are not necessarily formed on an entire surface of the lenticular lens medium. For example, it is also possible to form the linear convex lenses only on a frame portion of the lenticular lens medium and to form a flat surface on a center portion of the lenticular lens medium.

The lenticular lens medium with fine lens pitch (high LPI) is used for viewing an object at close range, or for viewing a small or fine object. In contrast, the lenticular lens medium with rough lens pitch (low LPI) is used for viewing a large object. The lens pitch is expressed using a unit "LPI" representing the number of lenses disposed in 1 inch. The lens pitch (lens interval) is expressed as Lp.

The lenses (i.e., linear convex lenses) of the lenticular lens medium 10 have arc-shaped portions S generally having radii (i.e., lens radii) of R. However, the arc-shaped portions S can have complex free curved surfaces in order to correct aberration. The lens pitch Lp is in a range of 20 to 160 LPI, and particularly in a range of 40 to 75 LPI when the size of the lenticular lens medium 10 is A4 or A3 size. Further, the focal length and the lens radius R are proportional. As the lens radius R is small, the image is large and the image is focused at a distance. In contrast, as the lens radius R is large, the image is small and the image is focused at a close range. Examples and Comparison Examples described below use the lenticular lens media 10 whose longitudinal directions are oriented in vertical direction (i.e., in the feeding direction) as shown in FIG. 10, and each lenticular lens medium 10 has the lens pitch Lp of 0.34 mm (75 LPI), the lens radius of 0.26 mm and the medium thickness T of 0.5 mm.

Using the above described process, plate-like sheets (having the thickness T of 0.5 mm) and lenticular lens medium (having the thickness of 0.5 mm) of Examples 1 through 7 and Comparison Examples 1 through 4 were obtained. The volume resistivity, the surface resistivity and the optical transparency of the plate-like sheets were measured. The measurement results are shown in FIG. 13. The printing was performed on the lenticular lens medium 10 using the electrophotographic printer "Microline Pro 9800 PS-E" (manufactured by Oki Data Corporation). In order to evaluate the printing result, the printing density (transferring property), the fixing rate (fixing property) and the glossiness were measured. The measurement results of printing density (transferring property), fixing rate (fixing property) and glossiness are shown in FIG. 13.

As can be understood from the above described principles of electrophotographic photographic printing process, the printing density may vary due to conditions of the developing process, charging process and exposure process. Basically, the amount of the toner adhering to the photosensitive drum (after the development process) does not change, even if there are changes in volume resistivity, surface resistivity or thickness of medium. Therefore, in the printing tests of Examples and Comparison Examples, the conditions of the developing process, charging process and exposure process were set so that the average printing density (OD value) of colors K, Y, M, and C was 1.5 in the case where a general paper medium was used. The printing density was measured using the densitometer "X-Rite 528". The printing density (i.e., transferring property) is defined as being successful when the printing density is higher than or equal to 1.4, and is defined as being unsuccessful when the printing density is lower than 1.4. The fixing rate (i.e., fixing property) is defined as being successful when the fixing rate is higher than or equal to 90%. This is because, when the fixing rate is higher than or equal to 90%, the toner does not fall off from the lenticular lens medium even if the printed portion is lightly scratched with a finger. Also, the glossiness is defined as being successful when the glossiness is higher than or 45%. This is because, when the glossiness is higher than or 45%, the surface has substantially no convexes or concaves, and the toner sufficiently melts. The optical transparency is defined as being successful when the optical transparency is higher than or equal to 80%. In this regard, as the optical transparency is higher, the image formed on the flat surface (opposite to the linear convex lenses) can be viewed via the linear convex lenses more brightly and more clearly. In contrast, as the optical transparency is low, the printing of the image appears dark. The printed image is satisfactorily visible in a dimly lit place when the optical transparency is higher than or equal to above 80%.

To summarize the results shown in FIG. 13, Examples 1-7 exhibited successful results in terms of printing density, fixing rate and glossiness. Comparison Examples 1-4 exhibited excellent fixing rate and glossiness, but did not exhibit successful results in terms of printing density.

The fixing condition (i.e., condition on which the toner melts) is not only determined by a temperature, but also determined by a heat quantity (i.e., a temperature multiplied by a duration time) applied to the toner even if the toner has a certain melting point. As the printing speed increases, a duration time of application of heat to the toner by the fixing device is shortened, and therefore it is necessary to raise the fixing temperature by the fixing device. Further, it is necessary to take into account the influence of the heat resistance temperature and the heat diffusion of the resin of the lenticular lens medium in addition to the heat quantity.

The melting point of the toner is in a range of 120 to 130° C. In this regard, the heat quantity applied to the toner during printing is determined by the temperature setting (° C.) of the fixing device multiplied by the duration time while the toner contacts the fixing roller. Therefore, the heat quantity applied to the toner is substantially kept constant even if the printing speed varies. In the case where the heat quantity from the fixing device is constant, when the thickness of the lenticular lens medium is thin, the surface temperature of the lenticular lens medium increases due to the lack of heat diffusion. Conversely, when the thickness of the lenticular lens medium is thick, heat diffusion of the lenticular lens medium increases, and the temperature of the lenticular lens medium does not relatively increase.

The heat quantity that the lenticular lens medium receives from the fixing device is constant irrespective of the printing speed as described above. However, the printing speed has an influence on the surface temperature of the lenticular lens medium due to heat diffusion. When the printing speed is fast, there is very little increase in surface temperature of the lenticular lens medium. However, when the printing speed is slow, there might arise some influence on the surface temperature of the lenticular lens medium. Therefore, suitable ranges of the thickness and printing speed of the lenticular lens medium were obtained by experiments using resins having heat resistance temperature of 70° C. (because the heat resistance temperature of general resins is 70° C. or higher).

The lenticular lens media were formed of composition which is the same as Example 1 to have thicknesses of 0.1 mm, 0.2 mm and 0.5 mm. The electrophotographic printer "Microline Pro 9800 PS-E" (manufactured by Oki Data Corporation) was used to perform printing on the lenticular lens media. The thicknesses of the lenticular lens medium and printing speeds (5, 10 and 18 PPM) were varied as shown in FIG. 14. In order to evaluate printing results, the fixing rate, and deformation or warping of the lenticular lens medium are measured. FIG. 14 shows conditions and measurement results of Examples 8-12 and Comparison Examples 5-7.

The fixing rate is defined to be successful when the fixing rate is higher than or equal to 90%. The deformation and warping were determined by observing with eyes or touching with finger. "O" indicates successful results where no deformation, ripple or warping is observed. "X" indicates unsuccessful results.

As the experimental results, it is understood that excellent printing materials are obtained when the medium thickness is thicker than or equal to 0.3 mm, and printing speed is faster than or equal to 10 PPM (corresponding to the medium feeding speed of 45 mm/sec).

Next, as Example 13, calcium chloride was added to the composition of Example 3. To be more specific, 0.05 weight parts of calcium chloride (high-grade reagent, manufactured by Wako Pure Chemical Industries Ltd.) was added to total 100 weight parts of hydrophilic polymer, methacryl resin (thermoplastic resin) and dodecylbenzenesulfonic acid potassium salt (anionic surfactant), i.e., the composition of Example 3. The resultant material was formed into pellets in a similar manner to Example 3. Then, using the injection forming machine, a plate-like sheet having the thickness of 0.5 mm was formed. Further, using the extruder and the T-die, the lenticular lens medium having the thickness of 0.5 mm was formed. The plate-like sheet and the lenticular lens medium of Comparison Example 8 were formed of the composition which is the same as Example 1. The resultant plate-like sheets and the lenticular lens media (Example 13 and Comparison Example 8) were left in a glove box provided with airflow for a week, and then volume resistivity, surface resistivity and optical transparency were measured.

The measurement results are shown in FIG. 15. In Example 13, the optical transparency was slightly higher than that of Example 1, although the volume resistivity and the surface resistivity were the same as those of Example 1. No adherent material was observed on the lenticular lens medium of Example 13. In contrast, an adherent material was slightly observed on the lenticular lens medium of Comparison Example 8.

In this regard, the printing density (i.e., the transferring property) is defined as being successful when the printing density is higher than or equal to 1.4, and is defined as being unsuccessful when the printing density is lower than 1.4. The fixing rate is defined as being successful when the fixing rate is higher than or equal to 90%. The glossiness is defined as being successful when the glossiness is higher than or equal to 40%.

Using the electrophotographic printing apparatus "Microline Pro 9800 PS-X" (manufactured by Oki Data Corporation), the printing was performed on the lenticular lens media. Then, the printing density, the fixing rate and the glossiness were measured. The measurement results are shown in FIG. 15. The transparency and glossiness of Example 13 are better than those of Comparison Example 8. The printing density and the fixing rate of Example 13 are almost the same as those of Comparative Example 8. From these results, it is understood that, by adding divalent or polyvalent metal salts containing calcium or the like, it becomes possible to prevent seepage of material (i.e., adherent material) that causes cloudiness of the surface of the lenticular lens medium and to thereby prevent the decrease in optical transparency in a long-term preservation.

Furthermore, as Example 14, a toner receiving layer coating liquid having the composition described later was coated (using a bar coating method) on the flat surface of the plate-like sheet (having a thickness of 0.5 mm) and the lenticular lens medium (having a thickness of 0.5 mm) obtained by the above described Example 1. The thickness of the toner receiving layer coating liquid was 5 μm after being dried. As Comparative Example 9, the plate-like sheet and the lenticular lens medium produced in a similar manner to Example 1 were used.

The toner receiving layer coating liquid contains:

| | |
|---|---|
| polyester resin ("Vylon" manufactured by Toyobo Co., Ltd., Tg: 67° C., molecular weight 1500): | 200 weight parts |
| dry silica ("Aerosil 200" Nihon Aerosil Co., Ltd., mean particle diameter: 12 μm): | 0.01 weight parts |
| toluene: | 40 weight parts |
| MEK: | 40 weight parts |

The toner was manufactured as follows: 100 weight parts of polyester resin (mean molecular weight is 3700, glass transition temperature Tg is 62°) as a toner resin, coloring agent and charge controlling agent were sufficiently stirred and mixed. The resultant material was heated for approximately 3 hours using a roll mill at 120° C. so that the resultant material melts. Then, the resultant material was cooled to a room temperature, was pulverized using an impact plate type pulverizing machine, and was classified. As a result, developer particles of approximately 8 μm were obtained. Further, silica particles were added to the developer particles, so as to obtain the toner of Example 14.

The volume resistivity, the surface resistivity and the transparency of the plate-like sheet were measured. Further, printing is performed on the lenticular lens medium using the "Microline Pro-9800 PS-E" (manufactured by Oki Data Corporation), and printing density (transferring property), fixing rate and glossiness were measured. The measurement results are shown in FIG. 16.

The printing density is defined as being successful when the printing density is higher than or equal to 1.4 (OD value), and is defined as being unsuccessful when the printing density is lower than 1.4. The fixing rate is defined as being successful when the fixing rate is higher than 90%. The glossiness is defined as being successful when the glossiness is higher than or equal to 40%.

Based on the results of Example 14, it is found that, by the provision of the toner receiving layer, the volume resistivity and the surface resistivity slightly increase but are in satisfactory ranges, and the optical transparency does not change. As for the printing result, there is substantially no difference in printing density or fixing rate, but there is an increase in glossiness. The reason is considered as follows. Because the toner receiving layer and the toner particles (the resin composition thereof) include the same polyester resin, the toner receiving layer melts and softens when the toner particles melt during fixing process, and good compatibility therebetween is obtained. Due to the good compatibility, the melting/fixing property of the toner particles with respect to the surface of the lenticular lens medium is enhanced, and the unevenness of the toner particles is reduced, so that the light scattering can be reduced to thereby enhance glossiness. Therefore, it is understood that, by the provision of the toner receiving layer, sharp images with low light scattering can be obtained. This effect is not obtained when the thickness of the toner receiving layer is thinner than 1 μm. Further, when the toner receiving layer is thicker than 10 μm (i.e., when the toner receiving layer is thicker with respect to the diameter of the toner particles of 5-8 μm), displacement of toner particles on the toner receiving layer may occur, and therefore resolution may be degraded. Therefore, the thickness of the toner receiving layer is preferably in a range of 1 to 10 μm.

Next, 0.1 weight parts of benzotriazol (2-(5-methyl-2-hydroxyphenyl)benzotriazol) named "Tinuvin P" (manufactured by Ciba Specialty Chemicals Incorporated) as UV absorbents, and 0.1 weight parts of hindered amine (HALS) named "Tinuvin 144" (manufactured by Ciba Specialty Chemicals Incorporated) as optical stabilizers were added to 100 weight parts of a composition of Example 1 containing hydrophilic polymer, methacryl resin (thermoplastic resin) and dodecylbenzenesulfonic acid potassium salt (anionic surfactant). The resultant material was formed into pellets in a similar manner to Example 1. Using these pellets, the plate-like sheets (having a thickness of 0.5 mm) ware formed by the injection forming machine, and the lenticular lens media (having a thickness of 0.5 mm) were formed by the extruding machine and the T-die.

In Example 19, both of the above described UV absorbents and the optical stabilizers were added to the composition of Example 1. In Example 20, only UV absorbents were added to the composition of Example 1. Further, as Comparison Example 10, the plate-like sheet and the lenticular lens medium obtained in a similar manner to those of Example 1 were prepared. The volume resistivity, surface resistivity and optical transparency were measured using the plate-like sheets. Further, printing was performed on the lenticular lens media using the electrophotographic printing apparatus "Microline Pro 9800PS-E" (manufactured by Oki Data Corporation), and the printing density, fixing rate, and glossiness were measured. The measurement results are shown in FIG. 17.

The printing density (i.e., transferring property) is defined as being successful when the printing density is higher than or equal to 1.4 (OD value), and is defined as being unsuccessful when the printing density is lower than 1.4. The fixing rate is defined as being successful when the fixing rate is higher than or equal to 90%. The glossiness is defined as being successful when the glossiness is higher than or equal to 40%.

Based on the results shown in FIG. 17, it is understood that the addition of UV absorbents and the optical stabilizers has little effect on the volume resistivity, surface resistivity and optical transparency. Further, it is understood that the addition of UV absorbents and the optical stabilizers has little effect on the printing density, fixing rate and glossiness. Next, long-term weather resistance test was performed for 2000 hours, using "Atlas Ci4000 Xenon Weather-o-meter" (manufactured by Toyo Seiki Seisaku-sho Ltd). This weather resistance test is a test equivalent to outdoor exposure for 24 months (2 years). As a result, Comparison Example 10 (without UV absorbents and optical stabilizers) exhibits worst degradation of optical transparency after the weather resistance test. Example 20 (with UV absorbents being added) exhibits less degradation of optical transparency. Example 19 (with US absorbents and optical stabilizers being added) exhibits least degradation of optical transparency. From these results, it is understood that the addition of the UV absorbents and the optical stabilizers is effective particularly in the case where the lenticular lens medium is used as a printing medium under outdoor exposure environment.

Next, 100 weight parts of 2-ethylhexyl acrylate, 60 weight parts of vinyl acetate, 8 weight parts of acrylate and 0.3 weight parts of benzoyl peroxide were allowed to react in toluen at approximately 60° C., so as to obtain polymer solution. With respect to 100 weight parts of solid content of the polymer solution, 4 weight parts of cross-linker "Tedrad C" (manufactured by Mitsubishi Chemical Corporation) was added. Then, the resultant material was coated on a polyester film having the thickness of 35 μm to from acrylate adhesive layer having the thickness of 25 μm, so that a protection film is formed. The resulting protection film was laminated onto the printing surface of the lenticular lens medium. The laminated protection film prevents scratches on the printing surface. Further, even if liquid stains exist on the printing surface, the liquid stains can be clearly wiped away therefrom.

Figure 18:
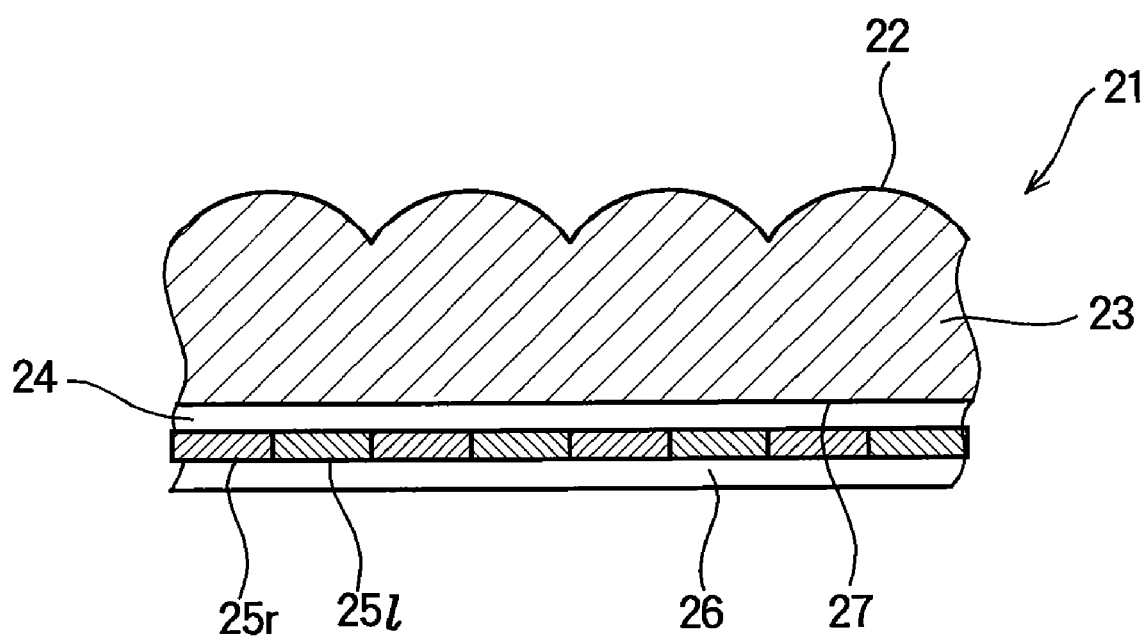
FIG. 18 is a cross-sectional view schematically showing another configuration example of the lenticular lens medium according to the embodiment of the present invention.

FIG. 18 is a sectional view of the lenticular lens medium 21 with the protection film 26 being bonded. The toner receiving layer 24 is formed on the printing surface 27 of the main body 23 of the lenticular lens medium 21 opposite to the concavo-convex portion (i.e., linear convex lenses) 22. The printing layers 25*r* and 25*l* are formed on the surface (i.e., the bottom surface in FIG. 18) of the toner receiving layer 24. The protection film 26 is formed on the surface of the printing layers 25*r* and 25*l*. With such a configuration, the printing layers 25*r* and 25*l* are efficiently transferred due to high electric conductivity of the lenticular lens medium 21 and due to the toner receiving layer 24. Further, the protection film 26 prevents scratches on the printing surface side, and causes liquid stains to be cleanly wiped away.

In above described the embodiment and Examples 1 through 21, the lenticular lens medium of the present invention is used as a transparent sheet-like printing medium for the electrophotographic printing apparatus. However, the lenticular lens medium of the present invention can be used as, for example, an OHP sheet or the like that transmits light with which image is projected onto a screen. The lenticular lens medium can also be arranged around the light source so as to obtain transmissive image or projected image. Further, the lenticular lens medium can be bonded to a transparent body such as a glass window for use as a displaying medium, advertising medium and decorative trim. The lenticular lens medium can also be colored for use as a plate-like printing medium. It is also possible to divide a large lenticular lens medium into small-sized media 112 of, for example, card size as shown in FIG. 12, and to print images thereon at the same time, so that small-sized printed media are effectively and economically obtained. In this case, it is possible to form the cuts 111 around the small-sized media so that each small medium is supported by several connecting portions 113 that can be easily broken with application of force. It is also possible to use a transparent or color plate-like sheet medium as a card.

The lenticular lens medium of the present invention can also be used as a printing medium of thermal transfer printing apparatus. Also, the lenticular lens medium can be used as a printing medium of an ink jet printing apparatus and an off-set printing apparatus by providing an ink absorption layer on the lenticular lens medium.

In the above described embodiment, the lenticular lens medium includes a plurality of linear convex lenses. However, it is possible to employ a structure such as a microarray lens in which a plurality of lenses in the form of hemispheric convexes or concaves (dots) are arranged, using resin material having the volume resistivity of $1\times10^7$-$1\times10^{14}$Ω·cm and the surface resistivity of $1\times10^8$-$1\times10^{15}$Ω/☐ as in the above described embodiment. Such a structure can be used as a printing medium in electrophotographic printing apparatuses or the like.

According to the preferred embodiment of the invention, the lenticular lens medium is composed of a composition including (a) 3-100 weight parts of a hydrophilic polymer comprising a polymer graft-copolymerized, (b) 0-97 weight parts of a thermoplastic resin within 100 weight parts in total of (a) and (b), and (c) 0.1-5 weight parts of an anionic surfactant. The composition can contain 0.001-5 weight parts of a divalent or polyvalent metal salts. One or both of UV absorbent and optical stabilizer can be added to the lenticular lens medium.

The polymer is preferably polymerized with 5-95 weight parts of one or more kinds of an ethylenically unsaturated monomer onto 5-95 weight parts of a rubber trunk polymer, within 100 weight parts in total of the rubber trunk polymer and the ethylenically unsaturated monomer. The rubber trunk polymer preferably includes 50-95 weight % of one or more kinds of a monomer (i) selected from a conjugated diene and/or an acrylic ester, 5-50 weight % of one or more kinds of a monomer (ii) having 4-500 alkylene oxide groups and further having an ethylenically unsaturated bond, and 0-40 weight % of one or more kinds of a polymerizable ethylenically unsaturated monomer (iii), which is polymerizable with the conjugated diene and/or the acrylic ester. The volume resistivity of the lenticular lens medium can be maintained when 5-80 weight parts (in particular, 10-60 weight parts) of the rubber trunk polymer is contained with respect to total 100 weight parts of the hydrophilic polymer (a) and the thermoplastic resin (b).

The thermoplastic resin (b) used together with the hydrophilic polymer (a) may be any arbitrary thermoplastic resin, and examples thereof are as follows: polyethylene, polypropylene, polystyrene, polyethylene terephthalate, polyvinyl chloride, polyvinylidene chloride, aromatic vinyl polymers, nitrile resins, (meth)acrylic resins composed of homopolymers or copolymers of (meth)acrylate esters, ABS resins, acrylonitrile-styrene resins, polycarbonate, polyamide resins, polyimide resins, polyester resins, fluorine-containing resins. It is preferable to use a resin having good compatibility with hydrophilic polymer. It is preferable to use an aromatic thermoplastic resin which does not substantially contain aromatic polymer component. More preferable examples of the thermoplastic resin (b) are (meth)acrylic resins and polyolefin resins. Furthermore, an acrylic acid ester is preferably used as at least one of the monomers (i) and (iii), in order to obtain a lenticular lens medium with particularly high transparency.

The anionic surfactant is preferably one or more kinds selected from a group consisting of alkylbenzene sulfonic acid salts, alkylnaphthalene sulfonic acid salts, perfluoroalkyl sulfonic acid salts, trifluoromethane sulfonic acid salts, and fatty acid salts thereof. The anionic surfactant is preferably alkali metal salts using metal atoms having an atomic number of not less than 19 (corresponding to potassium) and having an initiation temperature of weight loss of 250° C. or more defined by JIS-K7120. The amount of the anionic surfactant is preferably in a range of 0.1 to 5 weight parts.

A conventional anti-static conductive resin is given electric conductivity mainly by anti-static agent that exists on the surface of the resin, and therefore the conductivity is reduced by washing or wiping. However, the lenticular lens medium according to the present invention exhibits permanent conductivity. Further, the conductivity is generated in the thickness direction of the lenticular lens medium. While a mechanism thereof has not been fully clarified as yet, it is conceivable that a rubber trunk polymer comprises a monomer selected from a conjugate diene or acrylic acid ester, and further the monomer contains alkylene oxide groups, as well as such rubber trunk polymer is dispersed into graft component resin or a mixture of graft component resin and the thermoplastic resin as a matrix component in the form of mutual bridge at the time of processing. Further, a surfactant added thereto is selectively adsorbed principally by the rubber trunk polymer, so that electric charge moves principally through the rubber trunk polymer adsorbing the surfactant thereby dissipating and attenuating. Furthermore, since the rubber trunk polymer contains a monomer having alkylene oxide groups, mobility of electric charge remarkably increases, and the effect of addition of surfactant remarkably increases. Further, conventionally, the movement of electric charge is concentrated in the vicinity of the surface, and the electric charge easily moves in a direction parallel to the surface, so that the surface resistivity of the resin decreases, but the volume resistivity in the thickness direction does not decrease. However, according to the present invention, the volume resistivity in the thickness direction decreases and consequently the surface resistivity also decreases, but the surface resistivity is relatively large compared with the volume resistivity because the electric charge does not easily move in the surface direction. The small volume resistivity and large surface resistivity are properties required in a lenticular lens medium to be used with electrophotographic printing apparatus, and the lenticular lens medium according to the present invention satisfies these properties.

The lenticular lens medium according to the present invention includes a plurality of semicylindrical-shaped or arc-shaped elongated convex parts. By molding the above described resin, it is possible to obtain a configuration including a concavo-convex portion in which a plurality of transparent semicylindrical-shaped or arc-shaped elongated convex parts are arranged and a flat portion formed on a main surface opposite to the concavo-convex portion. A printing surface on which image is to be printed is formed on the flat portion of the lenticular lens medium. Such a lenticular lens medium is manufactured as follows. Using a Hershel mixer, raw materials comprising a hydrophilic polymer, a fatty series thermoplastic resin, an anionic surfactant and necessary additives are blended. Then, a resultant powder is formed into pellets using a parallel twin-type screw extruder. Then, the pellets are put into an injection forming machine, molten and injected into a mold. Alternatively, the pellets can be put into an extrusion forming machine. The lenticular lens medium of the present invention can be formed using the injection forming method or extrusion forming method. It is also possible to use other methods, for example, a vacuum formation, a casting or a hot press.

The lenticular lens medium according to the present invention can have a thickness of, for example, in a range of 0.3 to 3 mm. It is possible to form toner image on the printing surface of the lenticular lens medium using electrophotographic printing apparatus. The lenticular lens medium can have a toner receiving layer. A protection layer or a protection film can be formed to protect the printing surface after the toner image is printed.

While the preferred embodiments of the present invention have been illustrated in detail, it should be apparent that modifications and improvements may be made to the invention without departing from the spirit and scope of the invention as described in the following claims.

What is claimed is:

1. A lenticular lens medium forming a lenticular lens which comprises a plurality of semicylindrical-shaped or arc-shaped elongated convex parts, wherein the lenticular lens medium has a volume resistivity of $1\times10^7$-$1\times10^{14}$ Ω·cm and a surface resistivity of $1\times10^8$-$1.1\times10^{15}$ Ω/□, wherein the lenticular lens medium including the convex parts has a thickness of 0.3-3 mm, and wherein the lenticular lens medium has a printing surface and a toner receiving layer provided on the printing surface, the toner receiving layer having a thickness of 1-10 μm, the thickness of the toner receiving layer being especially adapted to receiving a toner having particles in the size of 5-8 μm.

2. The lenticular lens medium according to claim 1, wherein a toner image is formed on the toner receiving layer by means of an electrophotographic system.

3. The lenticular lens medium according to claim 1, further comprising a protection layer or a protection film provided to cover the toner receiving layer.

4. The lenticular lens medium according to claim 1, wherein the toner receiving layer is composed of material of the same kind as the toner which forms the toner image on the toner receiving layer.

5. The lenticular lens medium according to claim 1, wherein the microarray lens medium further comprises one or both of UV absorbents and optical stabilizers.

6. A microarray lens medium forming a microarray lens which comprises a plurality of semispherical-shaped dots, wherein the microarray lens medium has a volume resistivity of $1\times10^7$-$1\times10^{14}$ Ω·cm and a surface resistivity of $1\times10^8$-$1.1\times10^{15}$ Ω/□, and wherein the microarray lens medium further comprises at least one of a UV absorbent and an optical stabilizer.

7. The microarray lens medium according to claim 6, wherein the microarray lens medium has a printing surface and a toner receiving layer provided on the printing surface, the toner receiving layer having a thickness of 1-10 μm.

8. The microarray lens medium according to claim 7, wherein the toner receiving layer bears a toner image of a toner having a mean particle diameter of 5-8 μm.

9. The microarray lens medium according to claim 8, wherein the toner image is formed on the toner receiving layer by means of an electrophotographic system.

10. The microarray lens medium according to claim 7, further comprising a protection layer or a protection film provided to cover the toner receiving layer.

11. The microarray lens medium according to claim 7, wherein the toner receiving layer is composed of material of the same kind as a toner which forms a toner image on the surface of the toner receiving layer.

12. A lenticular lens medium comprising:
- a plurality of semicylindrical-shaped or arc-shaped elongated convex parts formed on a surface of the lenticular lens medium,
- a flat surface opposite to the surface on which the convex parts are formed, and
- a toner receiving layer provided on the flat surface, the toner receiving layer including material of the same kind as a toner which forms a toner image on the surface of the toner receiving layer.

13. The lenticular lens medium according to claim 12, wherein the toner receiving layer has a thickness of 1-10 μm.

14. The lenticular lens medium according to claim 13, wherein a material of the lenticular lens medium has a volume resistivity of $1 \times 10^7$-$1 \times 10^{14}$ Ω·cm and a surface resistivity of $1 \times 10^8$-$1.1 \times 10^{15}$ Ω/□.

15. The lenticular lens medium according to claim 12, wherein the toner has a mean particle diameter of 5-8 μm.

16. The lenticular lens medium according to claim 12, wherein the lenticular lens medium further comprises one or both of UV absorbents and optical stabilizers.

* * * * *